United States Patent
Viedt et al.

(10) Patent No.: US 11,417,336 B2
(45) Date of Patent: *Aug. 16, 2022

(54) METHODS AND SYSTEMS OF GENERATING A CUSTOMIZED RESPONSE BASED ON A CONTEXT

(71) Applicants: Cash Viedt, Las Vegas, NV (US); Ron Carter, Mathews, NC (US)

(72) Inventors: Cash Viedt, Las Vegas, NV (US); Ron Carter, Mathews, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/196,150

(22) Filed: Mar. 9, 2021

(65) Prior Publication Data

US 2021/0201905 A1 Jul. 1, 2021

Related U.S. Application Data

(63) Continuation-in-part of application No. 16/534,791, filed on Aug. 7, 2019, now Pat. No. 10,949,153.

(51) Int. Cl.
| | |
|---|---|
| *H04M 3/51* | (2006.01) |
| *G10L 15/22* | (2006.01) |
| *G10L 15/18* | (2013.01) |
| *G10L 15/30* | (2013.01) |
| *G06F 16/33* | (2019.01) |
| *G06F 16/332* | (2019.01) |
| *G10L 15/02* | (2006.01) |

(52) U.S. Cl.
CPC .......... *G10L 15/22* (2013.01); *G06F 16/3329* (2019.01); *G06F 16/3344* (2019.01); *G10L 15/02* (2013.01); *G10L 15/1815* (2013.01); *G10L 15/30* (2013.01); *G10L 2015/223* (2013.01); *G10L 2015/227* (2013.01)

(58) Field of Classification Search
CPC ..... G10L 15/22; G10L 15/02; G10L 15/1815; G10L 15/30; G10L 2015/223; G10L 2015/227; G06F 16/3329; G06F 16/3344; G06F 3/14; G06F 16/9035; G06F 3/167; G03H 1/2294; G03H 2226/05
See application file for complete search history.

(56) References Cited

U.S. PATENT DOCUMENTS

| | | | | |
|---|---|---|---|---|
| 2014/0317502 | A1* | 10/2014 | Brown | G06Q 10/02 715/706 |
| 2015/0186156 | A1* | 7/2015 | Brown | H04L 51/02 715/706 |
| 2016/0078791 | A1* | 3/2016 | Helms | H04N 9/3141 348/789 |
| 2017/0277993 | A1* | 9/2017 | Beaver | G06Q 30/0201 |
| 2018/0060031 | A1* | 3/2018 | Boesen | A63B 24/0062 |

(Continued)

*Primary Examiner* — Howard D Brown, Jr.

(57) ABSTRACT

Disclosed herein is a method of generating a customized response based on a context, in accordance with some embodiments. Accordingly, the method may include receiving, using a communication device, at least one sensor data from at least one sensor, analyzing, using a processing device, the at least one sensor data, determining, using the processing device, a context based on the analyzing, identifying, using the processing device, a customized profile associated with the context, retrieving, using a storage device, the customized profile, and generating, using the processing device, a customized response based on the at least one sensor data and the customized profile.

20 Claims, 16 Drawing Sheets

(56) References Cited

U.S. PATENT DOCUMENTS

| | | | |
|---|---|---|---|
| 2018/0273345 A1* | 9/2018 | Rao | B66B 5/021 |
| 2018/0366118 A1* | 12/2018 | Lovitt | G10L 15/22 |
| 2019/0018364 A1* | 1/2019 | Kim | H04M 3/567 |
| 2019/0051299 A1* | 2/2019 | Ossowski | G10L 15/22 |
| 2019/0095775 A1* | 3/2019 | Lembersky | G06N 20/00 |
| 2020/0012916 A1* | 1/2020 | Dolignon | G06F 9/453 |
| 2020/0137230 A1* | 4/2020 | Spohrer | H04M 3/527 |

* cited by examiner

METHODS AND SYSTEMS OF GENERATING A CUSTOMIZED RESPONSE BASED ON A CONTEXT

The current application is a continuation-in-part (CIP) application of a U.S. non-provisional application Ser. No. 16/534,791 filed on Aug. 7, 2019.

FIELD OF THE INVENTION

Generally, the present disclosure relates to the field of data processing. More specifically, the present disclosure relates to methods and systems of generating a customized response based on a context.

BACKGROUND OF THE INVENTION

The field of data processing is technologically important to several industries, business organizations, and/or individuals. In particular, the use of a customized response based on a context is prevalent for providing professional administrative, technical, administrative, or creative assistance to users remotely.

Existing techniques for generating a customized response based on a context are deficient with regard to several aspects. For instance, current technologies do not generate a customized response based on a context. Furthermore, current technologies do not provide a visual component such as a customized 3D hologram associated with the customized response based on a context.

Therefore, there is a need for improved methods and systems of generating a customized response based on a context that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of generating a customized response based on a context, in accordance with some embodiments. Accordingly, the method may include receiving, using a communication device, at least one sensor data from at least one sensor. Further, the at least one sensor data may be associated with at least one user. Further, the method may include analyzing, using a processing device, the at least one sensor data. Further, the method may include determining, using the processing device, a context based on the analyzing. Further, the method may include identifying, using the processing device, a customized profile associated with the context. Further, the method may include retrieving, using a storage device, the customized profile. Further, the method may include generating, using the processing device, a customized response based on the at least one sensor data and the customized profile. Further, the at least one sensor may include a microphone configured to receive the at least one sensor data. Further, the at least one sensor data may include a sound data. Further, the analyzing may include performing sound processing. Further, the customized profile may include a customized media profile. Further, the customized response may include a customized media response. Further, the sound data may include a natural language input and a voice command input. Further, the voice command input may include an instruction. Further, the analyzing may include natural language processing. Further, the customized media profile may include a customized voice profile and a background sound profile. Further, the generating may include translation of the natural language input based on the instruction and the customized media profile to generate the customized media response. Further, the customized media response may include a customized natural language response and a background sound response. Further, the voice command input may include the context. Further, the instruction of the voice command input may include a request by the at least one user for translating the natural language input into a person voice associated with a person. Further, the request may include a person identifier associated with the person. Further, the identifying may include selecting the customized voice profile associated with the person from a plurality of customized voice profiles associated with a plurality of persons based on the person identifier. Further, the translation may include applying the person voice associated with the person to the natural language input to generate the customized natural language response. Further, the customized natural language response may be associated with the person voice.

Further disclosed herein is a method of generating a customized response based on a context, in accordance with some embodiments. Accordingly, the method may include receiving, using a communication device, at least one sensor data from at least one sensor. Further, the at least one sensor data may be associated with at least one user. Further, the method may include analyzing, using a processing device, the at least one sensor data. Further, the method may include determining, using the processing device, a context based on the analyzing. Further, the method may include identifying, using the processing device, a customized profile associated with the context. Further, the method may include retrieving, using a storage device, the customized profile. Further, the method may include generating, using the processing device, a customized response based on the at least one sensor data and the customized profile. Further, the at least one sensor may include a microphone configured to receive the at least one sensor data. Further, the at least one sensor data may include a sound data. Further, the analyzing may include performing sound processing. Further, the customized profile may include a customized media profile. Further, the customized response may include a customized media response. Further, the sound data may include a natural language input and a voice command input. Further, the voice command input may include an instruction. Further, the analyzing may include natural language processing. Further, the customized media profile may include a customized voice profile and a background sound profile. Further, the generating may include translation of the natural language input based on the instruction and the customized media profile to generate the customized media response. Further, the customized media response may include a customized natural language response and a background sound response. Further, the voice command input may include the context. Further, the instruction of the voice command input may include a request by the at least one user for translating the natural language input into a person voice associated with a person. Further, the request may include a person identifier associated with the person. Further, the identifying may include selecting the customized voice profile associated with the person from a plurality of customized voice profiles associated with a plurality of persons based on the person identifier. Further, the translation may include applying the person voice associated with the person to the natural language input to generate the customized natural language response. Further, the customized natural language response may be associated with the person voice. Further, the method may include receiving, using the communication device, at least one natural language query associated with the at least one user from at least one input device. Further, the method may include analyzing, using the processing device, the at least one natural language query. Further, the method may include generating, using the processing device, at least one natural language reply based on the analyzing of the at least one natural language query. Further, the method may include applying, using the processing device, the person voice to the at least one natural language reply based on the selecting of the customized voice profile associated with the person. Further, the method may include generating, using the processing device, at least one customized natural language reply based on the applying of the person voice to the at least one natural language reply. Further, the at least one customized natural language reply may be associated with the person voice. Further, the method may include transmitting, using the communication device, the at least one customized natural language reply to at least one output device.

Further disclosed herein is a system of generating a customized response based on a context, in accordance with some embodiments. Accordingly, the system may include a communication device configured for receiving at least one sensor data from at least one sensor. Further, the at least one sensor data may be associated with at least one user. Further, the system may include a processing device communicatively coupled with the communication device. Further, the processing device may be configured for analyzing the at least one sensor data. Further, the processing device may be configured for determining a context based on the analyzing. Further, the processing device may be configured for identifying a customized profile associated with the context. Further, the processing device may be configured for generating a customized response based on the at least one sensor data and the customized profile. Further, the system may include a storage device communicatively coupled with the processing device. Further, the storage device may be configured for retrieving the customized profile. Further, the at least one sensor may include a microphone configured to receive the at least one sensor data. Further, the at least one sensor data may include a sound data. Further, the analyzing may include performing sound processing. Further, the customized profile may include a customized media profile. Further, the customized response may include a customized media response. Further, the sound data may include a natural language input and a voice command input. Further, the voice command input may include an instruction. Further, the analyzing may include natural language processing. Further, the customized media profile may include a customized voice profile and a background sound profile. Further, the generating may include translation of the natural language input based on the instruction and the customized media profile to generate the customized media response. Further, the customized media response may include a customized natural language response and a background sound response. Further, the voice command input may include the context. Further, the instruction of the voice command input may include a request by the at least one user for translating the natural language input into a person voice associated with a person. Further, the request may include a person identifier associated with the person. Further, the identifying may include selecting the customized voice profile associated with the person from a plurality of customized voice profiles associated with a plurality of persons based on the person identifier. Further, the translation may include applying the person voice associated with the person to the natural language input to generate the customized natural language response. Further, the customized natural language response may be associated with the person voice.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAIL DESCRIPTIONS OF THE INVENTION

Figure 1:
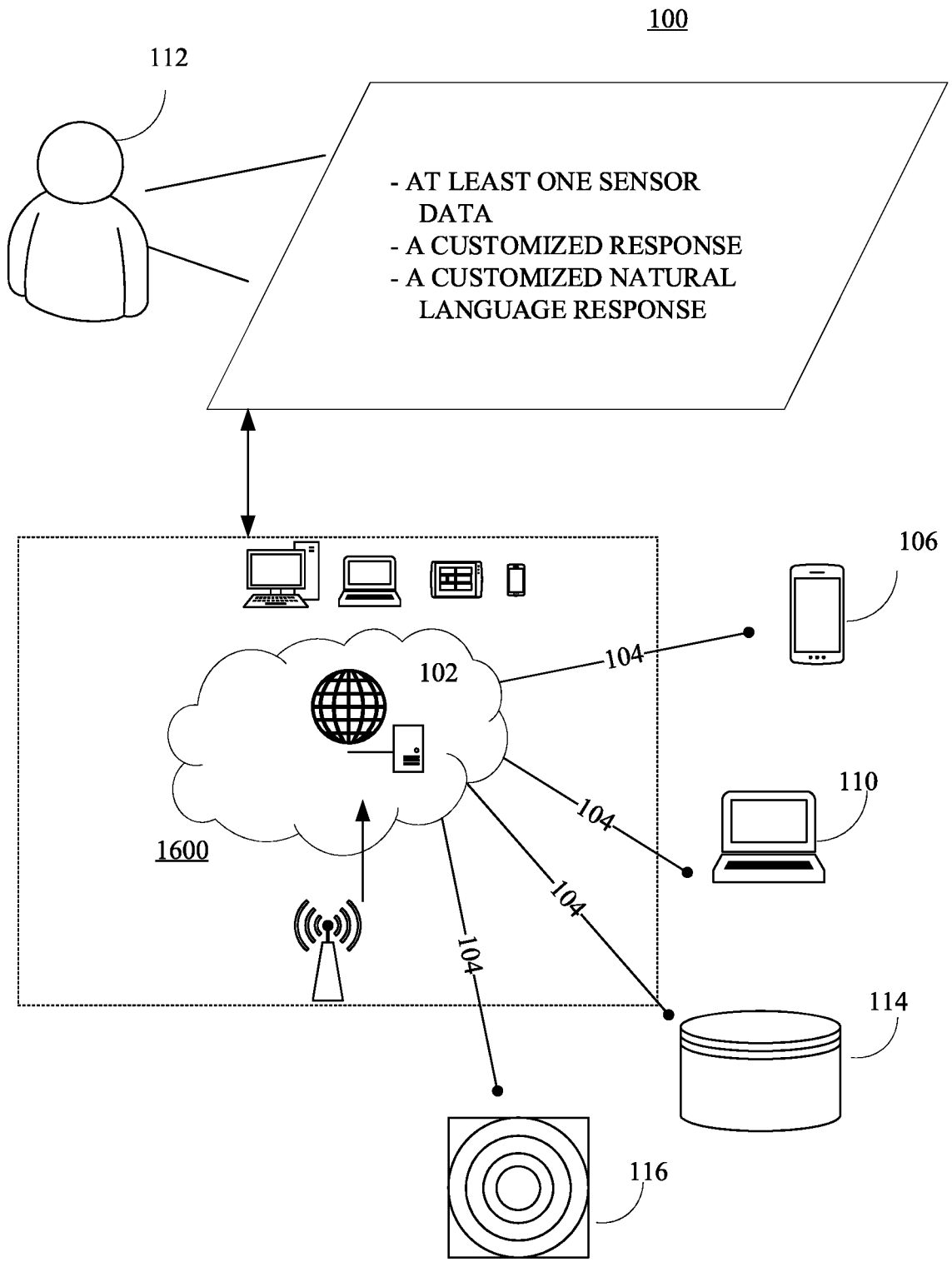
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods and systems of generating a customized response based on a context, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer etc.) and/or possession of a machine readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device etc.) corresponding to the performance of the one or more steps, physical state and/or physiological state and/or psychological state of the user, and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes methods and systems for generating a customized response based on a context. Further, the disclosed system may be associated with an application running on a communication device that enables the augmentation of a voice to replicate that of a celebrity or voice selected from a catalog of individuals' voices. Further, the disclosed system may be associated with an application running on a communication device, a personal assistant, or AI device that enables the conversion of a voice to a selected celebrity or from a catalog consisting of individuals' voices. Further, the disclosed system may be associated with an application running on a communication device or virtual assistant enabling a voice message to be provided by selecting a voice from a character of voices from a catalog or list. Further, the disclosed system may be associated with an application running on a communication device or virtual assistant enabling the selection of a voice from a list or catalog of voices prior to initiating a phone call. Further, the disclosed system may be associated with an application running on a communication device or virtual assistant enabling the selection of a voice from a list or catalog of voices during a phone call in responding to a caller or leaving a voice message for an unanswered call.

Further, the disclosed system may be associated with an application with artificial intelligence and machine learning that may learn and replicate a sound or voice which can then be assigned to an output such as robot, virtual assistant, personal assistant, AI device, doorbell, phone, messaging service, augmented reality, virtual reality, holograms, GPS, etc. (example play a message from a family member app learns to replicate the voice sound and can take on the voice or sounds of that person or character.)

Further, the disclosed system may allow a user to click on an email and have artificial intelligence voice catalog be selected to have the application read email to the user aloud especially when connected to vehicle example car play etc. Further, the disclosed system may facilitate voice interchangeability when read aloud and have artificial intelligence and machine learning that may be able to replicate a person's voice and be used from a voicemail or sound bite to be added to the voice catalog.

Example: I call and leave a friend a voicemail or voice text and caipad can learn to replicate that voice and I can assign it to a name and then future times in the app I can have that voice read aloud my emails in that selected voice.

Further, the virtual assistant application may be able to interpret human speech and deliver a response via a synthesized voice. Further, the virtual assistant application may deliver the response such as an answer to the questions, read text messages, tell jokes, make phone calls, play music, and control smart appliances. The virtual assistant application delivers a preselected response via the synthesized voice and also there may be a preselected visual component associated with the preselected response.

Further, the application may be a customizable voice for artificial intelligence and personal assistant devices (CAIPAD or KIPAD) application. Further, the CAIPAD application may enable a user to select voices and personalities from a library that may be best suited to the user, according to the mood of the user at any given time. Further, the CAIPAD may allow the user to select a voice from a voice library. Further, the voice library may include a voice profile of a member of the family, a celebrity, a popular person, a historic person, etc. Further, the voice profile may be requested by the user by giving the specific command to the virtual assistant device which may be running the CAIPAD application. Further, a personal assistant device running the CAIPAD application may register the request and immediately begin to respond in the voice profile requested by the user.

Further, the CAIPAD application may also interpret the mood of the user to determine the voice profile that may be best suited for the user in that mood. Further, the user in a particular mood may find certain voice profiles more comforting and soothing than others. Further, the voice profile may be funny and livelier than a monotone robot-like response. Further, the CAIPAD application may have a parent voice profile to interface with a child while the parents may not be present around the child.

Further, the CAIPAD application may also answer a phone call and/or video doorbell through the virtual assistant. Further, the user may also set a unique safe word that would let the CAIPAD application know to use a certain voice as the voice of the user to ward off strangers at the door or to let off the appearance that a young child may be alone at home. Further, the CAIPAD application may have a feature of parental control. Further, the feature may allow responsible and restrictive usage for the child.

Further, the CAIPAD application may also allow a holographic projection or hologram of the person through which the virtual assistant may be interfacing with the user.

Further, the CAIPAD application may be capable of recognizing at least one user from a plurality of users and execute a data platform associated with the at least one user.

Further, the CAIPAD application may provide security features. Further, the security feature may include a voice lock mechanism. Further, the voice lock mechanism engages or disengages based on a voice command from at least one user. Further, the at least one user may be authorized to use the CAIPAD application. Further, the voice lock mechanism may prevent any unauthorized use of the CAIPAD application.

Referring now to figures, FIG. 1 is an illustration of an online platform 100 consistent with various embodiments of the present disclosure. By way of non-limiting example, the online platform 100 to facilitate generating a customized response based on a context may be hosted on a centralized server 102, such as, for example, a cloud computing service. The centralized server 102 may communicate with other network entities, such as, for example, a mobile device 106

(such as a smartphone, a laptop, a tablet computer etc.), other electronic devices 110 (such as desktop computers, server computers etc.), databases 114, and sensors 116 over a communication network 104, such as, but not limited to, the Internet. Further, users of the online platform 100 may include relevant parties such as, but not limited to, end-users, administrators, service providers, service consumers and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 1600.

Figure 2:
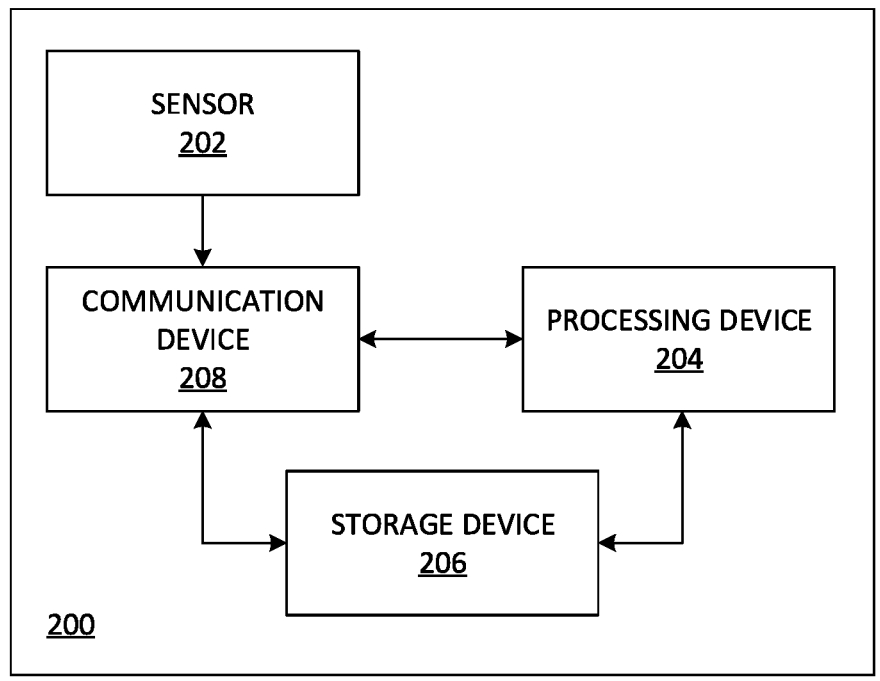
FIG. 2 is a block diagram of a system for facilitating the generation of a customized response based on a context, in accordance with some embodiments.

FIG. 2 is a block diagram of a system 200 to facilitate the generation of a customized response based on a context, in accordance with some embodiments. Further, the system 200 may include, at least one sensor 202, a communication device 208, a processing device 204, and a storage device 206.

Further, the at least one sensor 202 may be configured for sensing at least one sensor data associated with at least one user. Further, the at least one sensor 202 may be configured to generate at least one sensor data based on the sensing. Further, the at least one sensor 202 may include a sound sensor, an image sensor, a temperature sensor, a location sensor, a motion sensor, etc. Further, the at least one sensor data may include sound data, image data, temperature data, location data, motion data, etc. Further, the at least one sensor 202 may be communicatively coupled with the system 200. Further, the at least one sensor 202 may communicate the at least one sensor data to the system 200.

Further, the communication device 208 may be configured for receiving the at least one sensor data. Further, the communication device 208 may be configured for receiving the at least one sensor data from the at least one sensor 202 associated with the at least one user.

Further, the processing device 204 may be configured for analyzing the at least one sensor data. Further, the processing device 204 may be configured for determining a context based on analyzing. Further, the processing device 204 may be configured for identifying a customized profile associated with the context. Further, the processing device 204 may be configured for generating a customized response based on the at least one sensor data and the customized profile.

Further, the storage device 206 may be configured for retrieving the customized profile from a database (such as a database 114).

Further, in some embodiments, the system 200 may facilitate the generation of a customized response based on a context. Further, the system 200 may include the at least one sensor 202. Further, the at least one sensor 202 may include the image sensor configured to generate the image data. Further, the image sensor, in an instance, may include a camera. Further, the communication device 208 may be configured for receiving the image data. Further, the processing device 204 may be configured for analyzing the image data by performing image processing and generating a customized response based on the image data and the customized profile. Further, the customized response may include a customized media response. Further, the storage device 206 may retrieve the customized profile. Further, the customized profile may include a customized media profile.

Further, in some embodiments, the system 200 to facilitate the generation of a customized response based on a context may include the at least one sensor 202. Further, the at least one sensor 202 may include the sound sensor. Further, the sound sensor, in an instance, may include a microphone. Further, the microphone may be configured for sensing the at least one sensor data. Further, the at least one sensor data may include a sound data. Further, the communication device 208 may be configured to receive the sound data. Further, the processing device 204 may be configured for analyzing the sound data by performing sound processing and generating a customized response based on the sound data and the customized profile. Further, the customized response may include a customized media response. Further, the storage device 206 may be configured for retrieving a customized profile. Further, the customized profile may include a customized media profile.

Further, in some embodiments, the microphone may be configured for sensing a natural language input. Further, the processing device 204 may be configured for analyzing the natural language input using natural language processing and generating the customized media response. Further, the customized media response may include a customized natural language response with a corresponding background sound response and a customized visual response with a corresponding background visual response based on a customized voice profile with a corresponding background sound profile and a customized visual profile with a corresponding background visual profile. Further, the storage device 206 may be configured for retrieving the customized media profile. Further, the customized media profile may include the customized voice profile with the corresponding background sound profile and the customized visual profile with the corresponding background visual profile.

Further, in some embodiments, the storage device 206 may be configured for retrieving the customized media profile. Further, the customized media profile may include an audio and 3D hologram. Further, the customized media profile may be associated with at least one of a person and a corresponding event.

Further, according to some embodiments, the at least one sensor 202 may include the microphone. Further, the microphone may be configured for sensing a natural language input and a voice command input. Further, the voice command input may include an instruction. Further, the processing device 204 may be configured for analyzing the natural language input and the voice command input using natural language processing and generating the customized media response by translating natural language input based on the instruction and a customized voice profile. Further, the customized media response may include a customized natural language response and a background sound response. Further, the storage device 206 may be configured for retrieving the customized media profile. Further, the customized media profile may include the customized voice profile and a background sound profile.

Further, in some embodiments, the storage device 206 may be configured for retrieving the customized media profile from a database (such as a database 114). Further, the customized voice profile may be associated with a personality and the background sound profile may be associated with an event.

Figure 3:
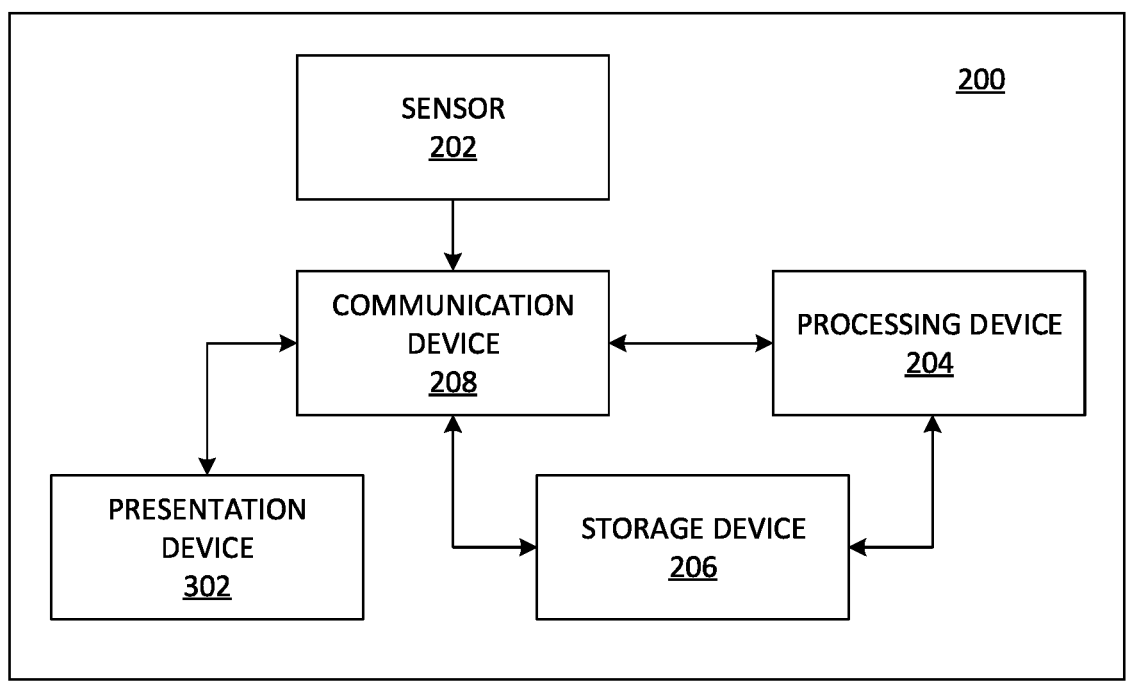
FIG. 3 is a flowchart of a method for facilitating the generation of a customized response based on a context, in accordance with some embodiments.

Further, in some embodiments, a presentation device 302 (as shown in FIG. 3) may be configured for presenting the customized media response. Further, the presentation device 302 may include an audio output device. Further, the audio output device may include a speaker.

Further, in some embodiments, the microphone may be configured for receiving the natural language input and the instruction from a first user. Further, the presentation device 302 may be configured for presenting the customized media response. Further, the presentation device 302 may include a smart doorbell system.

FIG. 3 is a block diagram of a system 200 to facilitate the generation of a customized response based on a context, in accordance with some embodiments. Further, the system 200 may include, the at least one sensor 202, the communication device 208, the processing device 204, the storage device 206, and the presentation device 302.

Further, the at least one sensor 202, the communication device 208, the processing device 204, and the storage device 206 may be described above.

Further, according to some embodiments, the system 200 may include the presentation device 302. Further, the presentation device 302 may be configured to present the customized response to the at least one user. Further, the customized response may include the customized media response. Further, the presentation device 302, in an instance, may include a speaker, a 2D video output device, a 3D video output device, a projector, a holographic projector, etc. Further, the presentation device 302, in an instance, may include the smart doorbell system. Further, the presentation device 302 may be communicatively coupled with the system 200. Further, the customized media response may be communicated to the presentation device 302. Further, the presentation device 302 may be configured to present the customized media response to the at least one user.

Figure 4:
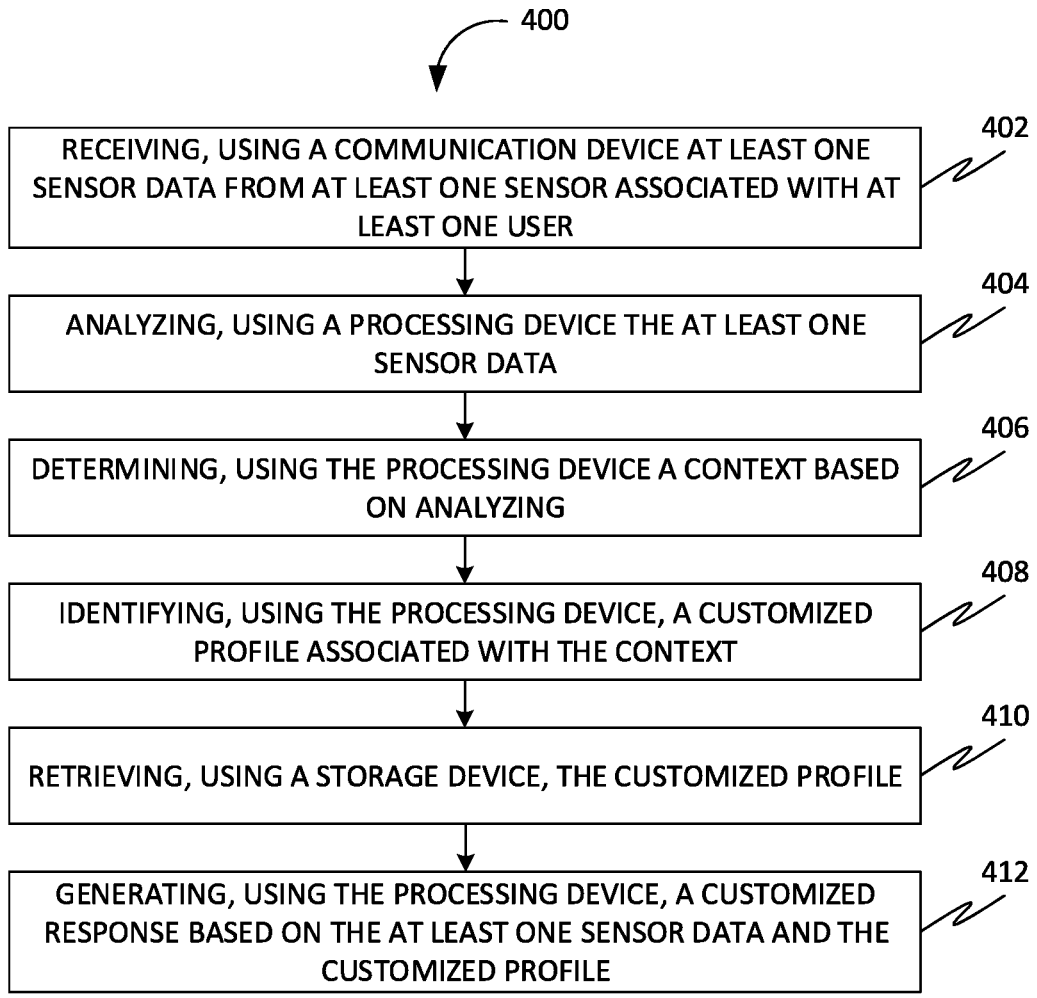
FIG. 4 is a flowchart of a method for facilitating the generation and presentation of a customized response based on a context, in accordance with some embodiments.

FIG. 4 is a flowchart of a method 400 to facilitate the generation of a customized response based on a context, in accordance with some embodiments. Further, at 402, the method 400 may include a step of receiving, using a communication device at least one sensor data from at least one sensor associated with at least one user. Further, the at least one sensor may include a sound sensor, an image sensor, a temperature sensor, a location sensor, a motion sensor, and so on. Further, the at least one sensor data may include sound data, image data, temperature data, location data, motion data, and so on.

Further, at 404, the method 400 may include a step of analyzing, using a processing device the at least one sensor data. Further, the analyzing of the at least one sensor data may include sound processing, image processing, natural language processing, and so on. Further, the input sound may be analyzed through sound processing and/or natural language processing. Further, the image data may be analyzed through image processing.

Further, at 406, the method 400 may include a step of determining, using the processing device a context based on analyzing. Further, the at least one sensor data may be analyzed and based on analyzing the context may be determined. Further, the context may include a background, framework, or surrounding of one or more occurrences. Further, the one or more occurrences may include a vocal command by the at least one user, a vocal request by the at least one user, a conversation of at least two users, metrological information of the locality of the at least one user, time of the day, and so on.

Further, at 408, the method 400 may include a step of identifying, using the processing device a customized profile associated with the context. Further, the context may include the background of the one or more occurrences. Further, the customized profile may be identified based on the context. Further, the customized profile, in an instance, may include a customized media profile. Further, the customized media profile may include a voice profile with a corresponding background sound profile and/or a visual profile with a corresponding background visual profile. Further, the voice profile with the corresponding background sound profile may be associated with at least one of a person and a corresponding event. Further, the visual profile with the corresponding background visual profile and may be associated with at least one of a person and a corresponding event.

Further, the customized media profile may include a voice profile and/or a visual profile. Further, the voice profile may include audio. Further, the visual profile may include 2D video profile, 3D video profile, 3D hologram profile, etc. Further, the voice profile and the visual profile may be associated with a personality. Further, the personality, in an instance, may include one or more members of the at least one user family, one or more celebrities, one or more historic person.

Further, at 410, the method 400 may include a step of retrieving, using the storage device the customized profile. Further, the customized profile may be stored in a database (such as a database 114). Further, the customized profile may be retrieved from the database (such as a database 114) based on the identification.

Further, at 412, the method 400 may include a step generating, using the processing device, the customized response based on the at least one sensor data and the customized profile. Further, the generation of customized response may include processes such as (but not limited to) speech to speech translation, speech to text translation, natural language generation (NLG), natural language understanding (NLU), audio processing, video processing, computer-generated holography, etc. Further, the customized response may include a customized media response. Further, the customized media response may include an audio response and a visual response. Further, the visual response may include 2D video, 3D video, 3D hologram, etc. Further, the customized media response may include a customized voice response, a background sound response, a customized voice response with a corresponding background response, a customized visual response, a background visual response, and a customized visual response with a corresponding background visual response.

Further, in some embodiments, the method 400 of generating a customized response based on a context may include the at least one sensor. Further, the at least one sensor may include an image sensor configured to generate image data. Further, the analyzing may include performing image processing. Further, the customized profile may include a customized media profile. Further, the customized response may include a customized media response.

Further, in some embodiments, the method 400 of generating a customized response based on a context may include the at least one sensor. Further, the at least one sensor may include the sound sensor. Further, the sound sensor, in an instance, may include a microphone. Further, the sound data, in an instance, may include one or more sounds. Further, the one or more sounds in an instance may include a natural language input, a speech input, a music input, a noise input, etc. Further, the microphone may be configured to receive the sound data. Further, the analyzing may include performing sound processing. Further, the customized profile may include a customized media profile. Further, the customized response may include a customized media response.

Further, in some embodiments, the sound data may include a natural language input. Further, the analyzing may include natural language processing. Further, the customized media profile may include a customized voice profile with a corresponding background sound profile and a customized visual profile with a corresponding background visual profile. Further, the generating may include generation of the customized media response. Further, the customized media response may include a customized natural language response with a corresponding background sound response and a customized visual response with a corresponding background visual response.

Further, in some embodiments, the customized media profile may include an audio and a 3D hologram. Further, the media profile may be associated with at least one of a person and a corresponding event. Further, the at least one person may include at least one member of the at least one user family, at least one celebrity, and at least one historical person. Further, the corresponding event may include birds chirping, wind gusting, dog barking, etc.

Further, in some embodiments, a presenting may include the presentation of the customized media response using a presentation device. Further, the presentation device may include an audio output device and a video output device. Further, the customized media response may be presented using a speaker and a 3D holographic projector Further, according to some embodiments, the sound data may include a natural language input and a voice command input. Further, the voice command input may include an instruction. Further, the analyzing may include natural language processing. Further, the customized media profile may include a customized voice profile and a background sound profile. Further, the generating may include translation of the natural language input based on the instruction and the customized media profile to generate the customized media response. Further, the customized media response may include a customized natural language response and a background sound response.

Further, in some embodiments, the customized voice profile may be associated with a personality. Further, the background sound profile may be associated with an event. Further, the personality, in an instance, may include one or more members of the at least one user family, one or more celebrities, one or more historic person. Further, the event may include birds chirping, wind gusting, dog barking, guns blazing, etc.

Further, in some embodiments, a presenting may include the presentation of the customized media response using a presentation device. Further, the presentation device may include an audio output device. Further, the audio output device may include a speaker.

Further in some embodiments, the microphone receives the natural language input and the instruction from a first user. Further, the presenting may include the presentation of the customized media response using a presentation device. Further, the presentation device may include a smart doorbell system.

Figure 5:
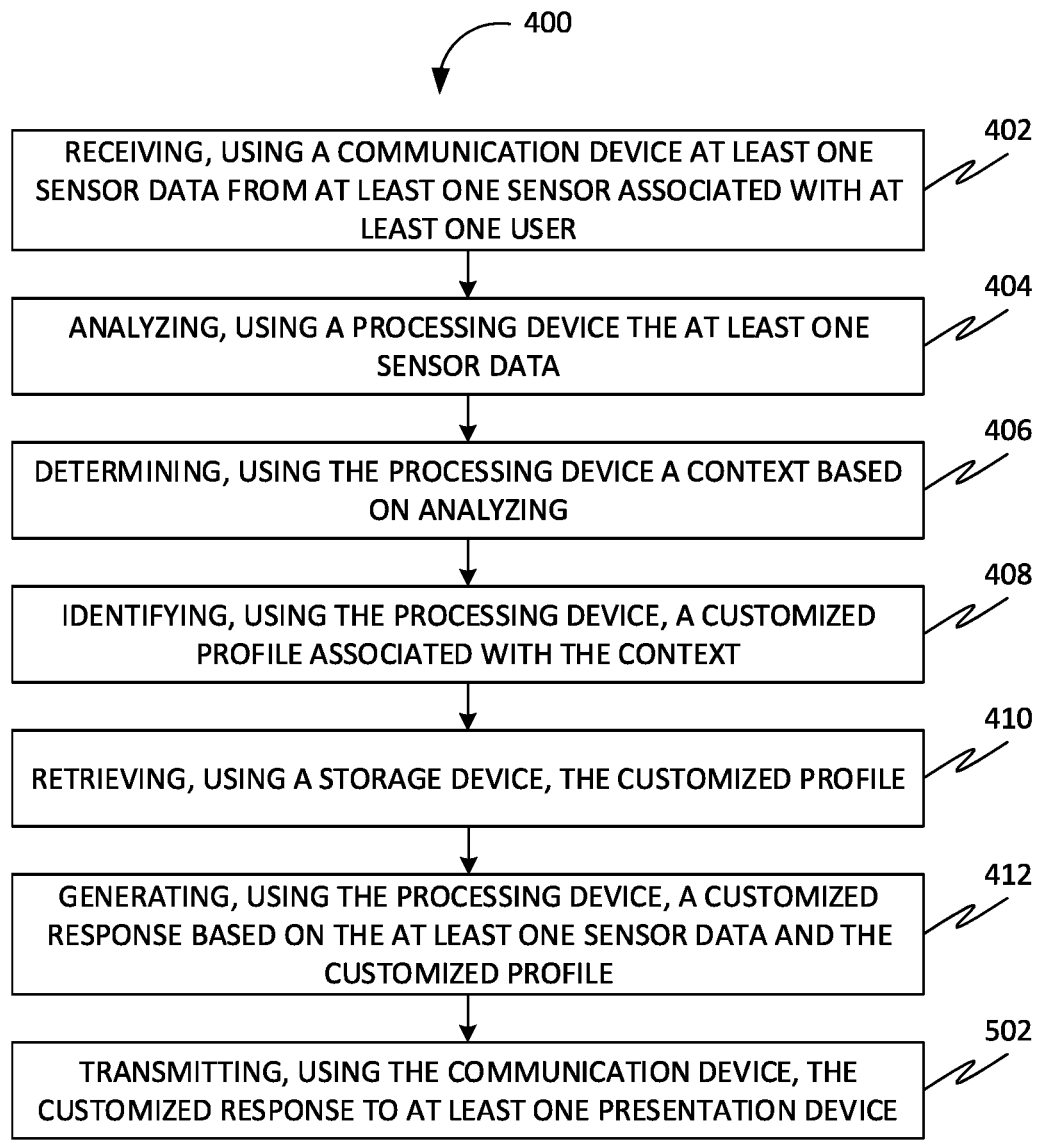
FIG. 5 is a flowchart of a method to facilitate the generation and presentation of a customized response based on a context, in accordance with some embodiments.

FIG. 5 is a flowchart of a method 400 to facilitate the generation and presentation of a customized response based on a context, in accordance with some embodiments. Further, step 402, 404, 406, 408, 410, and 412 of the method 400 may be described above.

Further, at 502, the method 400 may include a step of transmitting, using the communication device, the customized response to at least one presentation device. Further, the customized response may be transmitted to the at least one presentation device. Further, the at least one presentation device may present the customized response to at least one user. Further, the at least one presentation device may include an audio output device, a video output device, a text output device, an audio/video output device, etc. Further, the audio output device may include a speaker. Further, the video output device may include a 2D projector, a 3D projector, a 3D holographic projector, etc. Further, the audio/video device may include computing devices such as, but not limited to, a smartphone, a smartwatch, a tablet, a personal computer (PC), a desktop, a laptop, and so on.

Figure 6:
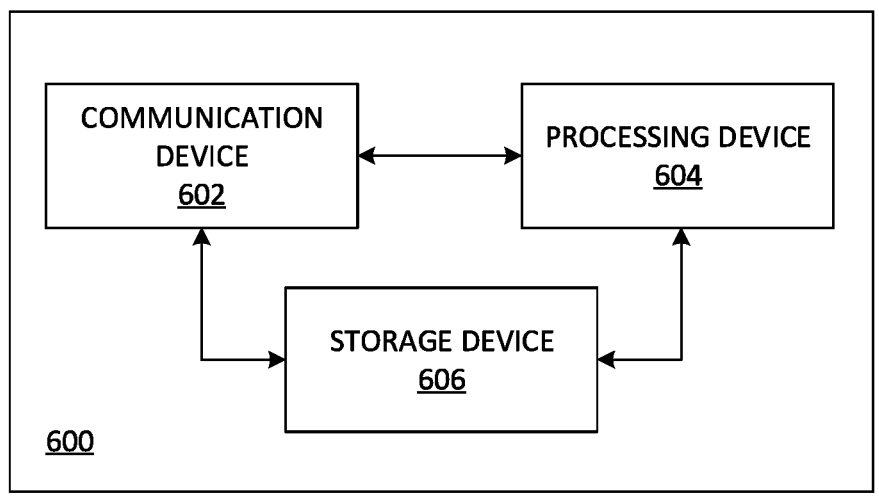
FIG. 6 is a block diagram of a system of generating a customized response based on a context, in accordance with some embodiments.

FIG. 6 is a block diagram of a system 600 of generating a customized response based on a context, in accordance with some embodiments. Accordingly, the system 600 may include a communication device 602 configured for receiving at least one sensor data from at least one sensor. Further, the at least one sensor data may be associated with at least one user.

Further, the system 600 may include a processing device 604 communicatively coupled with the communication device 602. Further, the processing device 604 may be configured for analyzing the at least one sensor data. Further, the processing device 604 may be configured for determining a context based on the analyzing. Further, the processing device 604 may be configured for identifying a customized profile associated with the context. Further, the processing device 604 may be configured for generating a customized response based on the at least one sensor data and the customized profile.

Further, the system 600 may include a storage device 606 communicatively coupled with the processing device 604. Further, the storage device 606 may be configured for retrieving the customized profile.

Further, the at least one sensor may include a microphone configured to receive the at least one sensor data. Further, the at least one sensor data may include a sound data. Further, the analyzing may include performing sound processing. Further, the customized profile may include a customized media profile. Further, the customized response may include a customized media response.

Further, the sound data may include a natural language input and a voice command input. Further, the voice command input may include an instruction. Further, the analyzing may include natural language processing. Further, the customized media profile may include a customized voice profile and a background sound profile. Further, the generating may include translation of the natural language input based on the instruction and the customized media profile to generate the customized media response. Further, the customized media response may include a customized natural language response and a background sound response.

Further, the voice command input may include the context. Further, the instruction of the voice command input may include a request by the at least one user for translating the natural language input into a person voice associated with a person. Further, the request may include a person identifier associated with the person. Further, the person identifier may include a person's name, a person's image, a person's voice, etc. Further, the person may include an individual, a character, a personality, etc. Further, the individual may include a celebrity. Further, the identifying may include selecting the customized voice profile associated with the person from a plurality of customized voice profiles associated with a plurality of persons based on the person identifier. Further, the translation may include applying the person voice associated with the person to the natural language input to generate the customized natural language response. Further, the customized natural language response may be associated with the person voice. Further, in an embodiment, the communication device 602 may be configured for transmitting the customized natural language response to at least one presenting device. Further, the at least one presenting device presents the customized natural language response. Further, the at least one presenting device may include a speaker, a computing device, etc. Further, the computing device may include a smartphone, a tablet, a smartwatch, a laptop, a desktop, etc.

Further, in some embodiments, the communication device 602 may be configured for receiving at least one natural language query associated with the at least one user from at least one input device. Further, the at least one input device may include a microphone, a computing device, etc. Further, the computing device may include a smartphone, a tablet, a smartwatch, a laptop, a desktop, etc. Further, the communication device 602 may be configured for transmitting at least one customized natural language reply to at least one output device. Further, the at least one output device may include a speaker, a computing device, etc. Further, the computing device may include a smartphone, a tablet, a smartwatch, a laptop, a desktop, etc. Further, the processing device 604 may be configured for analyzing the at least one natural language query. Further, the analyzing of the at least one natural language query may include performing a natural language processing on the at least one natural language query. Further, the processing device 604 may be configured for generating at least one natural language reply based on the analyzing of the at least one natural language query. Further, the processing device 604 may be configured for applying the person voice to the at least one natural language reply based on the selecting of the customized voice profile associated with the person. Further, the processing device 604 may be configured for generating the at least one customized natural language reply based on the applying of the person voice to the at least one natural language reply. Further, the at least one customized natural language reply may be associated with the person voice.

Further, in some embodiments, the communication device 602 may be configured for receiving at least one first natural language query associated with at least one first user from at least one first input device. Further, the at least one first input device may include a microphone, a computing device, etc. Further, the computing device may include a smartphone, a tablet, a smartwatch, a laptop, a desktop, etc. Further, the communication device 602 may be configured for transmitting at least one first customized natural language reply to at least one first output device. Further, the at least one first output device may include a speaker, a computing device, etc. Further, the computing device may include a smartphone, a tablet, a smartwatch, a laptop, a desktop, etc. Further, the storage device 606 may be configured for retrieving at least one first natural language reply based on the at least one first natural language query. Further, the processing device 604 may be configured for applying the person voice to the at least one first natural language reply based on the selecting of the customized voice profile associated with the person. Further, the processing device 604 may be configured for generating the at least one first customized natural language reply based on the applying of the person voice to the at least one first natural language reply. Further, the at least one first customized natural language reply may be associated with the person voice.

Further, in some embodiments, the communication device 602 may be configured for receiving a sample natural language input associated with the person from a second input device. Further, the second input device may include a microphone, a computing device, etc. Further, the computing device may include a smartphone, a tablet, a smartwatch, a laptop, a desktop, etc. Further, the processing device 604 may be configured for analyzing the sample natural language input. Further, the analyzing of the sample natural language input may include performing a natural language processing on the sample natural language. Further, the processing device 604 may be configured for determining at least one voice characteristic associated with the person based on the analyzing of the sample natural language input. Further, the at least one voice characteristic may include phonation, pitch, loudness, rate, etc. Further, the processing device 604 may be configured for generating the customized voice profile associated with the person based on the determining of the at least one voice characteristic of the person. Further, the storage device 606 may be configured for storing the customized voice profile.

Further, in some embodiments, the processing device 604 may be configured for assigning the customized voice profile to the person based on the generating of the customized voice profile. Further, the selecting of the customized voice profile may be based on the assigning.

Further, in some embodiments, the communication device 602 may be configured for receiving at least one first request from at least one third input device. Further, the at least one third input device may include a touchscreen, a computing device, etc. Further, the computing device may include a smartphone, a tablet, a smartwatch, a laptop, a desktop, etc. Further, the communication device 602 may be configured for transmitting at least one customized natural language content to at least one third output device. Further, the at least one third output device may include a speaker, a computing device, etc. Further, the computing device may include a smartphone, a tablet, a smartwatch, a laptop, a desktop, etc. Further, the processing device 604 may be configured for analyzing the at least one first request. Further, the processing device 604 may be configured for identifying at least one textual content based on the analyzing of the at least one first request. Further, the at least one textual content may include an email, a document, etc. Further, the processing device 604 may be configured for converting the at least one textual content into at least one natural language content based on the identifying of the at least one textual content. Further, the converting may include text to speech converting. Further, the processing device 604 may be configured for applying the person voice to the at least one natural language content based on the selecting of the customized voice profile associated with the person. Further, the processing device 604 may be configured for generating the at least one customized natural language content based on the applying the person voice to the at least one natural language content. Further, the at least one customized natural language content may be associated with the person voice.

Further, in some embodiments, the communication device 602 may be configured for transmitting a plurality of person identifiers associated with the plurality of persons for translating the natural language input into a plurality of person voices associated with the plurality of persons. Further, the request may include a selection of the person identifier of the plurality of person identifiers.

Further, in some embodiments, the storage device 606 may be configured for retrieving at least one media content associated with the person based on the person identifier. Further, the at least one media content may include a movie, a documentary, a podcast, a song, a lecture, etc. Further, the at least one media content may include the person. Further, the processing device 604 may be configured for analyzing the at least one media content. Further, the processing device 604 may be configured for determining at least one voice characteristic associated with the person based on the analyzing of the at least one media content. Further, the processing device 604 may be configured for generating the customized voice profile of the person based on the determining of the at least one voice characteristic. Further, the processing device 604 may be configured for assigning the customized voice profile to the person based on the generating of the customized voice profile. Further, the selecting of the customized voice profile may be based on the assigning.

Figure 7:
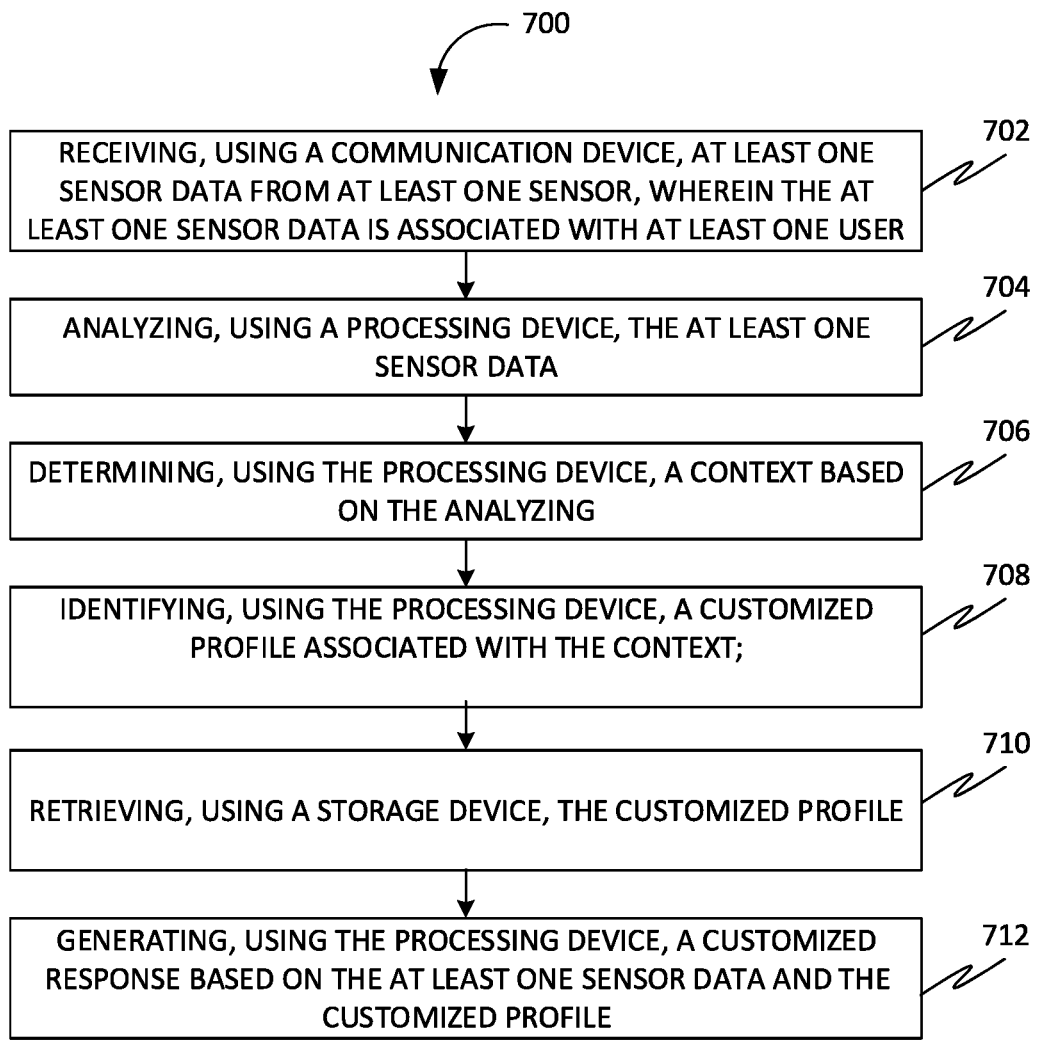
FIG. 7 is a flowchart of a method of generating a customized response based on a context, in accordance with some embodiments.

FIG. 7 is a flowchart of a method 700 of generating a customized response based on a context, in accordance with some embodiments. Accordingly, at 702, the method 700 may include receiving, using a communication device, at least one sensor data from at least one sensor. Further, the at least one sensor data may be associated with at least one user.

Further, at 704, the method 700 may include analyzing, using a processing device, the at least one sensor data.

Further, at 706, the method 700 may include determining, using the processing device, a context based on the analyzing.

Further, at 708, the method 700 may include identifying, using the processing device, a customized profile associated with the context.

Further, at 710, the method 700 may include retrieving, using a storage device, the customized profile.

Further, at 712, the method 700 may include generating, using the processing device, a customized response based on the at least one sensor data and the customized profile. Further, the at least one sensor may include a microphone configured to receive the at least one sensor data. Further, the at least one sensor data may include a sound data. Further, the analyzing may include performing sound processing. Further, the customized profile may include a customized media profile. Further, the customized response may include a customized media response. Further, the sound data may include a natural language input and a voice command input. Further, the voice command input may include an instruction. Further, the analyzing may include natural language processing. Further, the customized media profile may include a customized voice profile and a background sound profile. Further, the generating may include translation of the natural language input based on the instruction and the customized media profile to generate the customized media response. Further, the customized media response may include a customized natural language response and a background sound response. Further, the voice command input may include the context. Further, the instruction of the voice command input may include a request by the at least one user for translating the natural language input into a person voice associated with a person. Further, the request may include a person identifier associated with the person. Further, the identifying may include selecting the customized voice profile associated with the person from a plurality of customized voice profiles associated with a plurality of persons based on the person identifier. Further, the translation may include applying the person voice associated with the person to the natural language input to generate the customized natural language response. Further, the customized natural language response may be associated with the person voice.

Further, in some embodiments, the method 700 may include transmitting, using the communication device, a plurality of person identifiers associated with the plurality of persons for translating the natural language input into a plurality of person voices associated with the plurality of persons. Further, the request may include a selection of the person identifier of the plurality of person identifiers.

Figure 8:
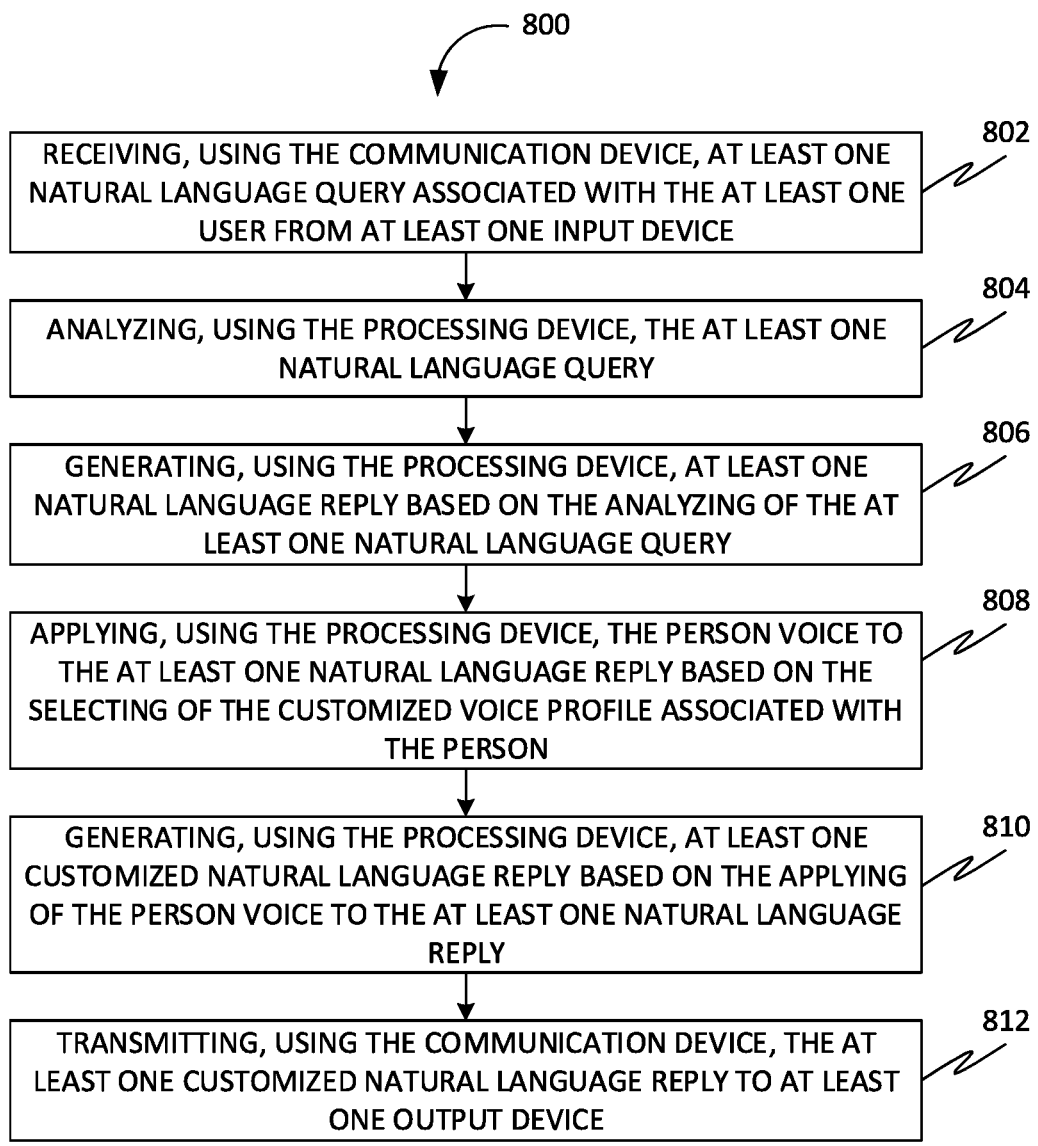
FIG. 8 is a flowchart of a method of generating a customized natural language reply for a natural language query based on the context, in accordance with some embodiments.

FIG. 8 is a flowchart of a method 800 of generating a customized natural language reply for a natural language query based on the context, in accordance with some embodiments. Accordingly, at 802, the method 800 may include receiving, using the communication device, at least one natural language query associated with the at least one user from at least one input device.

Further, at 804, the method 800 may include analyzing, using the processing device, the at least one natural language query.

Further, at 806, the method 800 may include generating, using the processing device, at least one natural language reply based on the analyzing of the at least one natural language query.

Further, at 808, the method 800 may include applying, using the processing device, the person voice to the at least one natural language reply based on the selecting of the customized voice profile associated with the person.

Further, at 810, the method 800 may include generating, using the processing device, at least one customized natural language reply based on the applying of the person voice to the at least one natural language reply. Further, the at least one customized natural language reply may be associated with the person voice.

Further, at 812, the method 800 may include transmitting, using the communication device, the at least one customized natural language reply to at least one output device.

Figure 9:
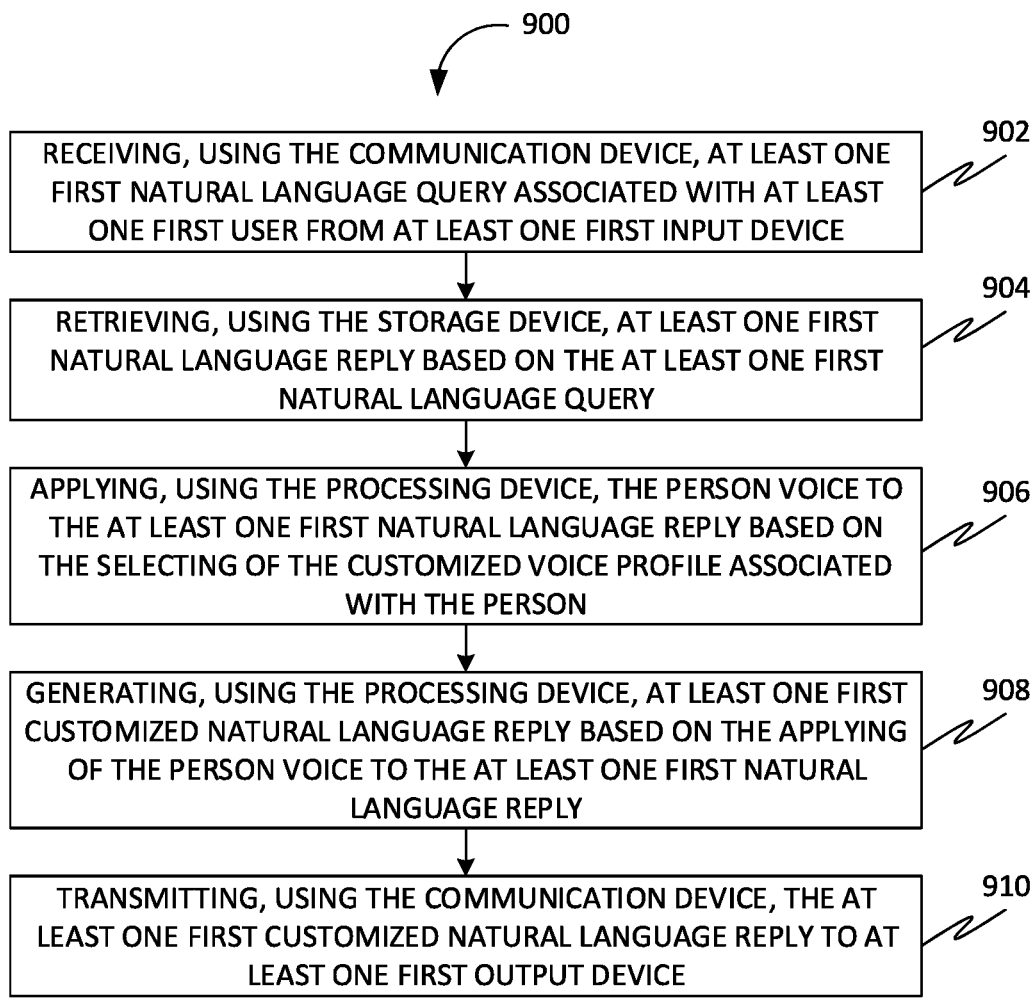
FIG. 9 is a flowchart of a method of generating a first customized natural language reply for a first natural language query based on the context, in accordance with some embodiments.

FIG. 9 is a flowchart of a method 900 of generating a first customized natural language reply for a first natural language query based on the context, in accordance with some embodiments. Accordingly, at 902, the method 900 may include receiving, using the communication device, at least one first natural language query associated with at least one first user from at least one first input device.

Further, at 904, the method 900 may include retrieving, using the storage device, at least one first natural language reply based on the at least one first natural language query.

Further, at 906, the method 900 may include applying, using the processing device, the person voice to the at least one first natural language reply based on the selecting of the customized voice profile associated with the person.

Further, at 908, the method 900 may include generating, using the processing device, at least one first customized natural language reply based on the applying of the person voice to the at least one first natural language reply. Further, the at least one first customized natural language reply may be associated with the person voice.

Further, at 910, the method 900 may include transmitting, using the communication device, the at least one first customized natural language reply to at least one first output device.

Figure 10:
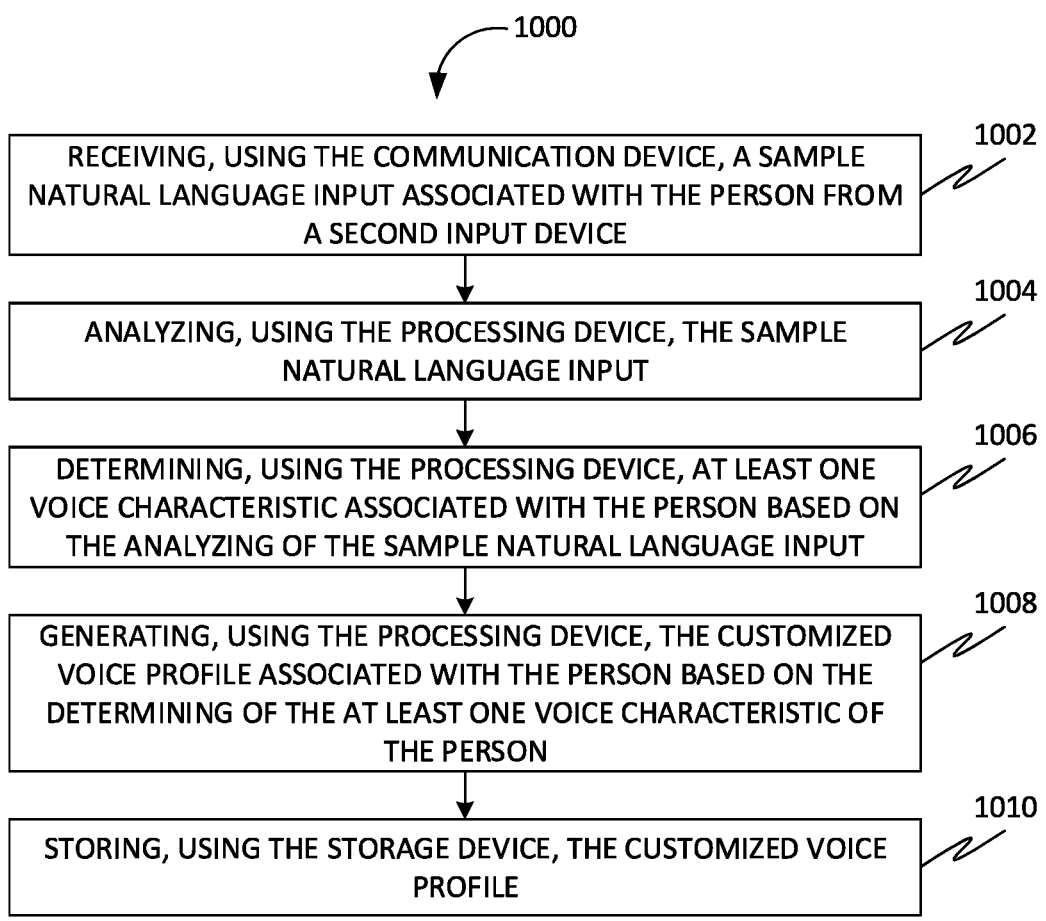
FIG. 10 is a flowchart of a method of generating the customized voice profile for generating the customized response based on the context, in accordance with some embodiments.

FIG. 10 is a flowchart of a method 1000 of generating the customized voice profile for generating the customized response based on the context, in accordance with some embodiments. Accordingly, at 1002, the method 1000 may include receiving, using the communication device, a sample natural language input associated with the person from a second input device.

Further, at 1004, the method 1000 may include analyzing, using the processing device, the sample natural language input.

Further, at 1006, the method 1000 may include determining, using the processing device, at least one voice characteristic associated with the person based on the analyzing of the sample natural language input.

Further, at 1008, the method 1000 may include generating, using the processing device, the customized voice profile associated with the person based on the determining of the at least one voice characteristic of the person.

Further, at 1010, the method 1000 may include storing, using the storage device, the customized voice profile.

In further embodiments, the method 1000 may include assigning, using the processing device, the customized voice profile to the person based on the generating of the customized voice profile. Further, the selecting of the customized voice profile may be based on the assigning.

Figure 11:
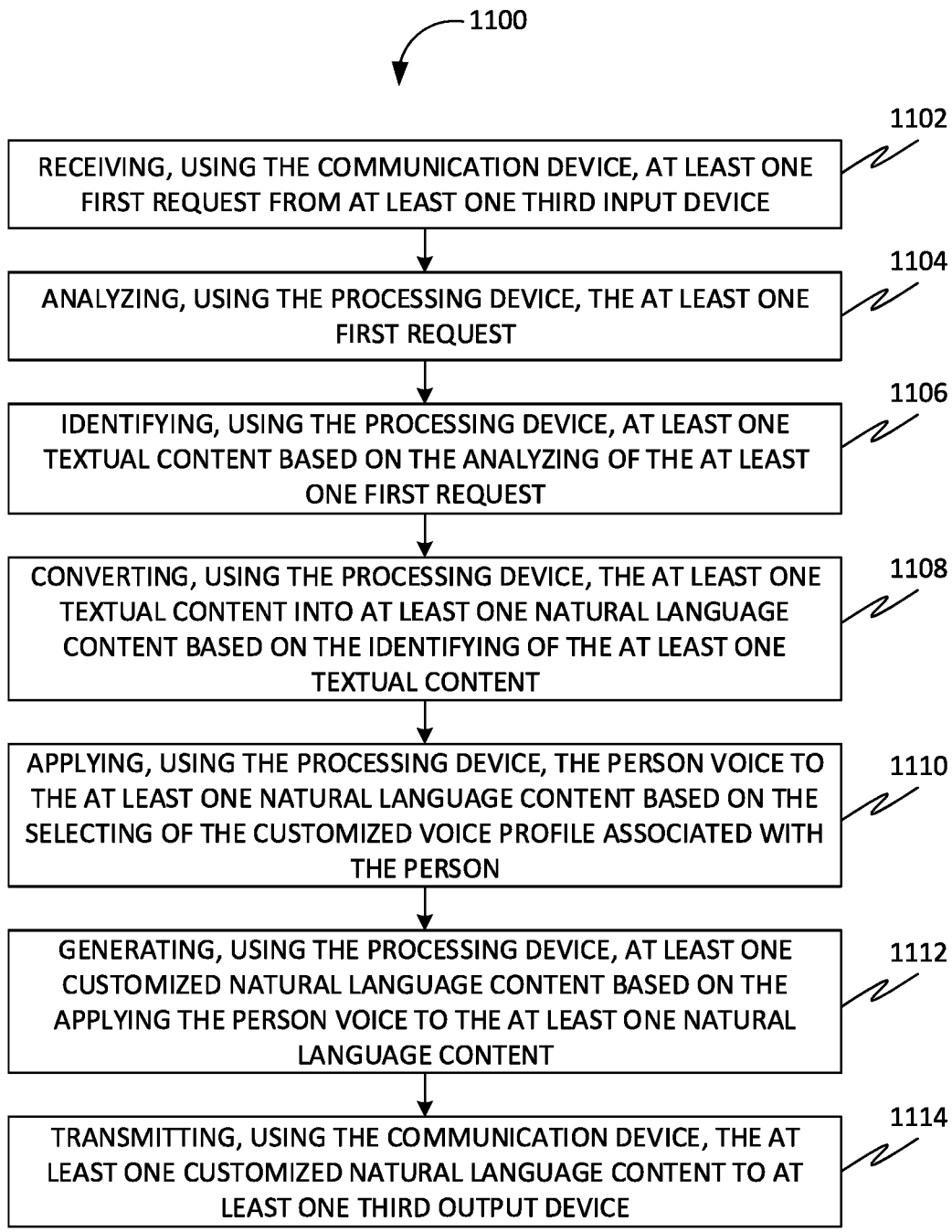
FIG. 11 is a flowchart of a method of generating a customized natural language content for a textual content based on the context, in accordance with some embodiments.

FIG. 11 is a flowchart of a method 1100 of generating a customized natural language content for a textual content based on the context, in accordance with some embodiments. Accordingly, at 1102, the method 1100 may include receiving, using the communication device, at least one first request from at least one third input device.

Further, at 1104, the method 1100 may include analyzing, using the processing device, the at least one first request.

Further, at 1106, the method 1100 may include identifying, using the processing device, at least one textual content based on the analyzing of the at least one first request.

Further, at 1108, the method 1100 may include converting, using the processing device, the at least one textual content into at least one natural language content based on the identifying of the at least one textual content.

Further, at 1110, the method 1100 may include applying, using the processing device, the person voice to the at least one natural language content based on the selecting of the customized voice profile associated with the person.

Further, at 1112, the method 1100 may include generating, using the processing device, at least one customized natural language content based on the applying the person voice to the at least one natural language content. Further, the at least one customized natural language content may be associated with the person voice.

Further, at 1114, the method 1100 may include transmitting, using the communication device, the at least one customized natural language content to at least one third output device.

Figure 12:
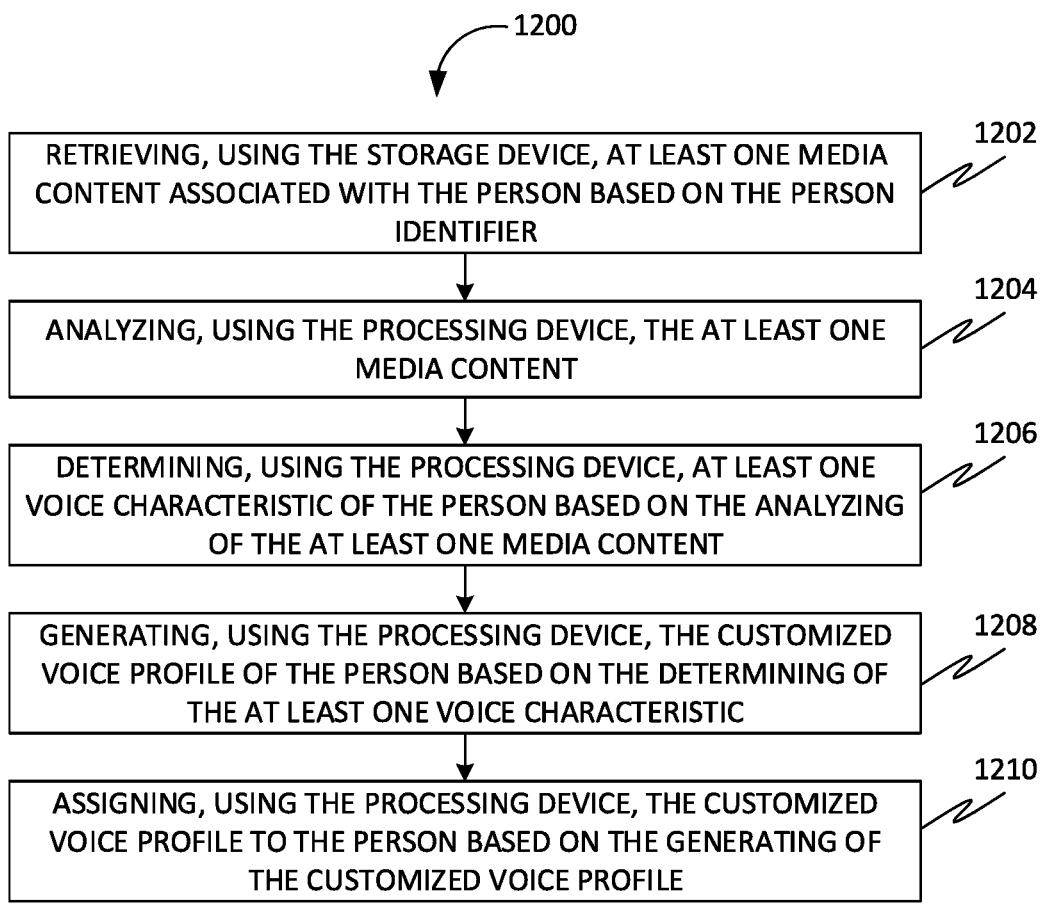
FIG. 12 is a flowchart of a method of assigning the customized voice profile to the person for generating the customized response based on the context, in accordance with some embodiments.

FIG. 12 is a flowchart of a method 1200 of assigning the customized voice profile to the person for generating the customized response based on the context, in accordance with some embodiments. Accordingly, at 1202, the method 1200 may include retrieving, using the storage device, at least one media content associated with the person based on the person identifier.

Further, at 1204, the method 1200 may include analyzing, using the processing device, the at least one media content.

Further, at 1206, the method 1200 may include determining, using the processing device, at least one voice characteristic of the person based on the analyzing of the at least one media content.

Further, at 1208, the method 1200 may include generating, using the processing device, the customized voice profile of the person based on the determining of the at least one voice characteristic.

Further, at 1210, the method 1200 may include assigning, using the processing device, the customized voice profile to the person based on the generating of the customized voice profile. Further, the selecting of the customized voice profile may be based on the assigning.

Figure 13:
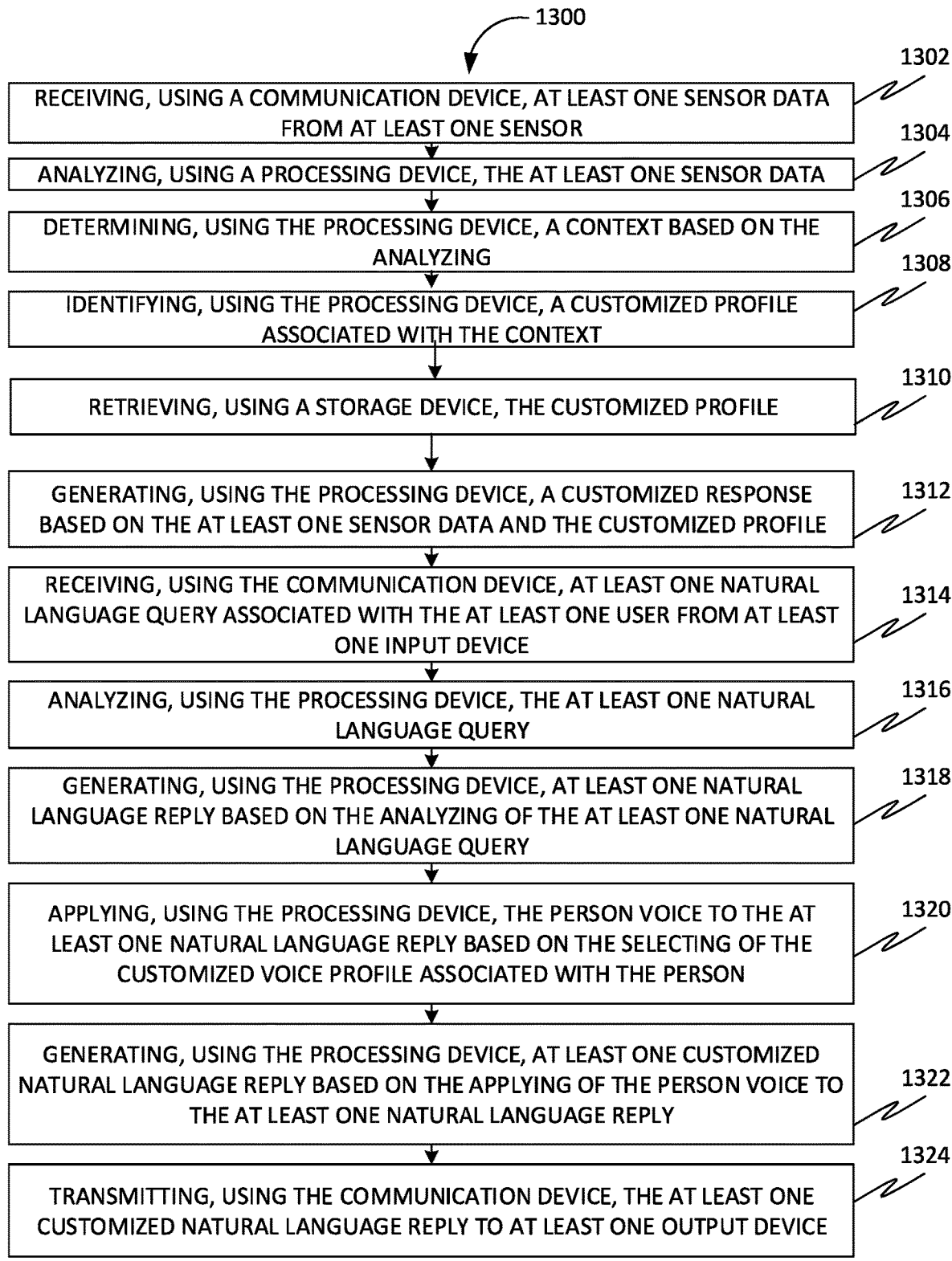
FIG. 13 is a flowchart of a method of generating a customized response based on a context, in accordance with some embodiments.

FIG. 13 is a flowchart of a method 1300 of generating a customized response based on a context, in accordance with some embodiments. Accordingly, at 1302, the method 1300 may include receiving, using a communication device, at least one sensor data from at least one sensor. Further, the at least one sensor data may be associated with at least one user.

Further, at 1304, the method 1300 may include analyzing, using a processing device, the at least one sensor data.

Further, at 1306, the method 1300 may include determining, using the processing device, a context based on the analyzing.

Further, at 1308, the method 1300 may include identifying, using the processing device, a customized profile associated with the context.

Further, at 1310, the method 1300 may include retrieving, using a storage device, the customized profile.

Further, at 1312, the method 1300 may include generating, using the processing device, a customized response based on the at least one sensor data and the customized profile. Further, the at least one sensor may include a microphone configured to receive the at least one sensor data. Further, the at least one sensor data may include a sound data. Further, the analyzing may include performing sound processing. Further, the customized profile may include a customized media profile. Further, the customized response may include a customized media response. Further, the sound data may include a natural language input and a voice command input. Further, the voice command input may include an instruction. Further, the analyzing may include natural language processing. Further, the customized media profile may include a customized voice profile and a background sound profile. Further, the generating may include translation of the natural language input based on the instruction and the customized media profile to generate the customized media response. Further, the customized media response may include a customized natural language response and a background sound response. Further, the voice command input may include the context. Further, the instruction of the voice command input may include a request by the at least one user for translating the natural language input into a person voice associated with a person. Further, the request may include a person identifier associated with the person. Further, the identifying may include selecting the customized voice profile associated with the person from a plurality of customized voice profiles associated with a plurality of persons based on the person identifier. Further, the translation may include applying the person voice associated with the person to the natural language input to generate the customized natural language response. Further, the customized natural language response may be associated with the person voice.

Further, at 1314, the method 1300 may include receiving, using the communication device, at least one natural language query associated with the at least one user from at least one input device.

Further, at 1316, the method 1300 may include analyzing, using the processing device, the at least one natural language query.

Further, at 1318, the method 1300 may include generating, using the processing device, at least one natural language reply based on the analyzing of the at least one natural language query.

Further, at 1320, the method 1300 may include applying, using the processing device, the person voice to the at least one natural language reply based on the selecting of the customized voice profile associated with the person.

Further, at 1322, the method 1300 may include generating, using the processing device, at least one customized natural language reply based on the applying of the person voice to the at least one natural language reply. Further, the at least one customized natural language reply may be associated with the person voice.

Further, at 1324, the method 1300 may include transmitting, using the communication device, the at least one customized natural language reply to at least one output device.

Figure 14:
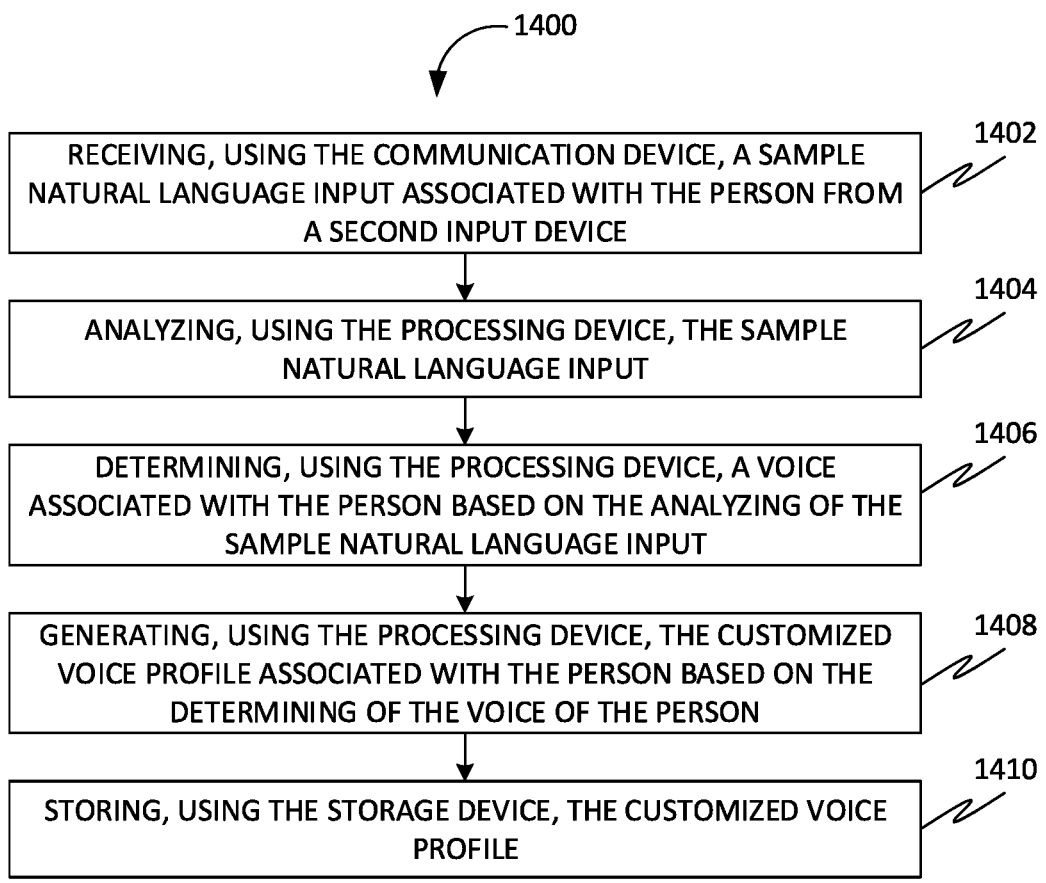
FIG. 14 is a flowchart of a method of generating the customized voice profile for generating the customized response based on the context, in accordance with some embodiments.

FIG. 14 is a flowchart of a method 1400 of generating the customized voice profile for generating the customized response based on the context, in accordance with some embodiments. Accordingly, at 1402, the method 1400 may include receiving, using the communication device, a sample natural language input associated with the person from a second input device.

Further, at 1404, the method 1400 may include analyzing, using the processing device, the sample natural language input.

Further, at 1406, the method 1400 may include determining, using the processing device, a voice associated with the person based on the analyzing of the sample natural language input.

Further, at 1408, the method 1400 may include generating, using the processing device, the customized voice profile associated with the person based on the determining of the voice of the person.

Further, at 1410, the method 1400 may include storing, using the storage device, the customized voice profile.

Further, in an embodiment, the method 1400 may include assigning, using the processing device, the customized voice profile to the person based on the generating of the customized voice profile. Further, the selecting of the customized voice profile may be based on the assigning.

Figure 15:
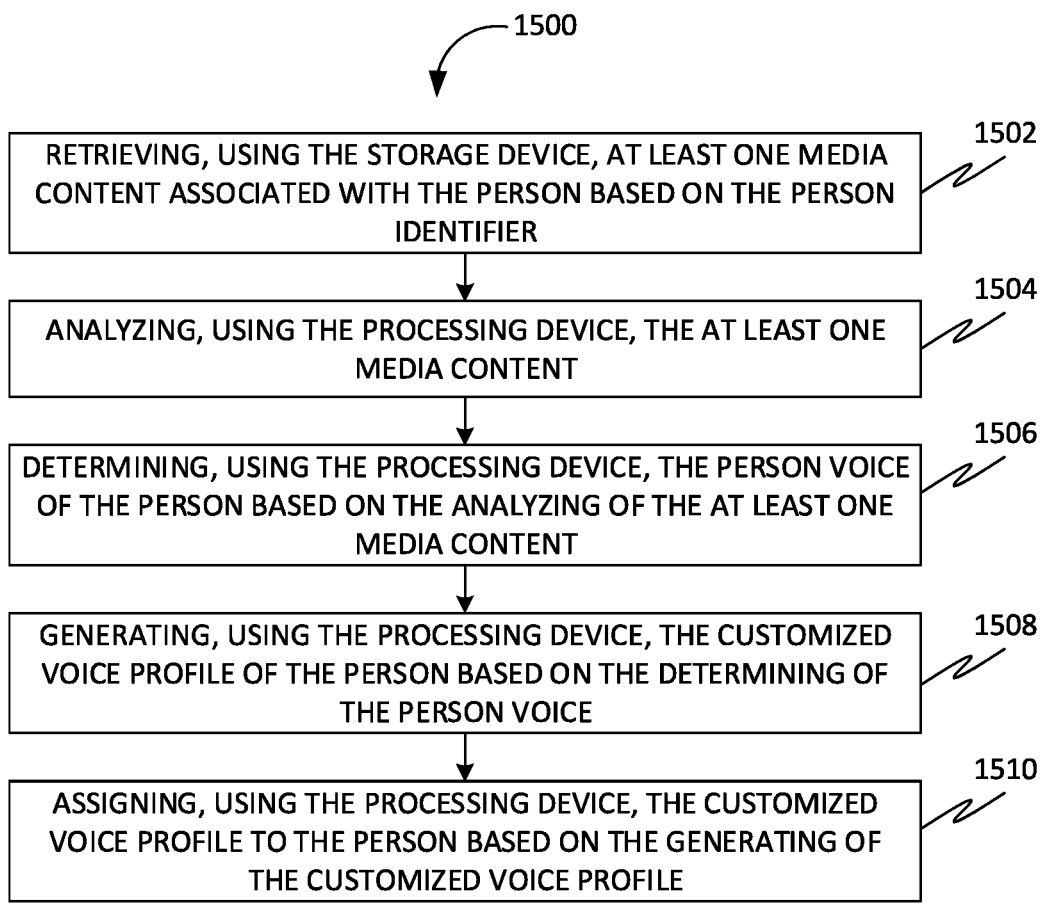
FIG. 15 is a flowchart of a method of assigning the customized voice profile to the person for generating the customized response based on the context, in accordance with some embodiments.

FIG. 15 is a flowchart of a method 1500 of assigning the customized voice profile to the person for generating the customized response based on the context, in accordance with some embodiments. Accordingly, at 1502, the method 1500 may include retrieving, using the storage device, at least one media content associated with the person based on the person identifier.

Further, at 1504, the method 1500 may include analyzing, using the processing device, the at least one media content.

Further, at 1506, the method 1500 may include determining, using the processing device, the person voice of the person based on the analyzing of the at least one media content.

Further, at 1508, the method 1500 may include generating, using the processing device, the customized voice profile of the person based on the determining of the person voice.

Further, at 1510, the method 1500 may include assigning, using the processing device, the customized voice profile to the person based on the generating of the customized voice profile. Further, the selecting of the customized voice profile may be based on the assigning.

Figure 16:
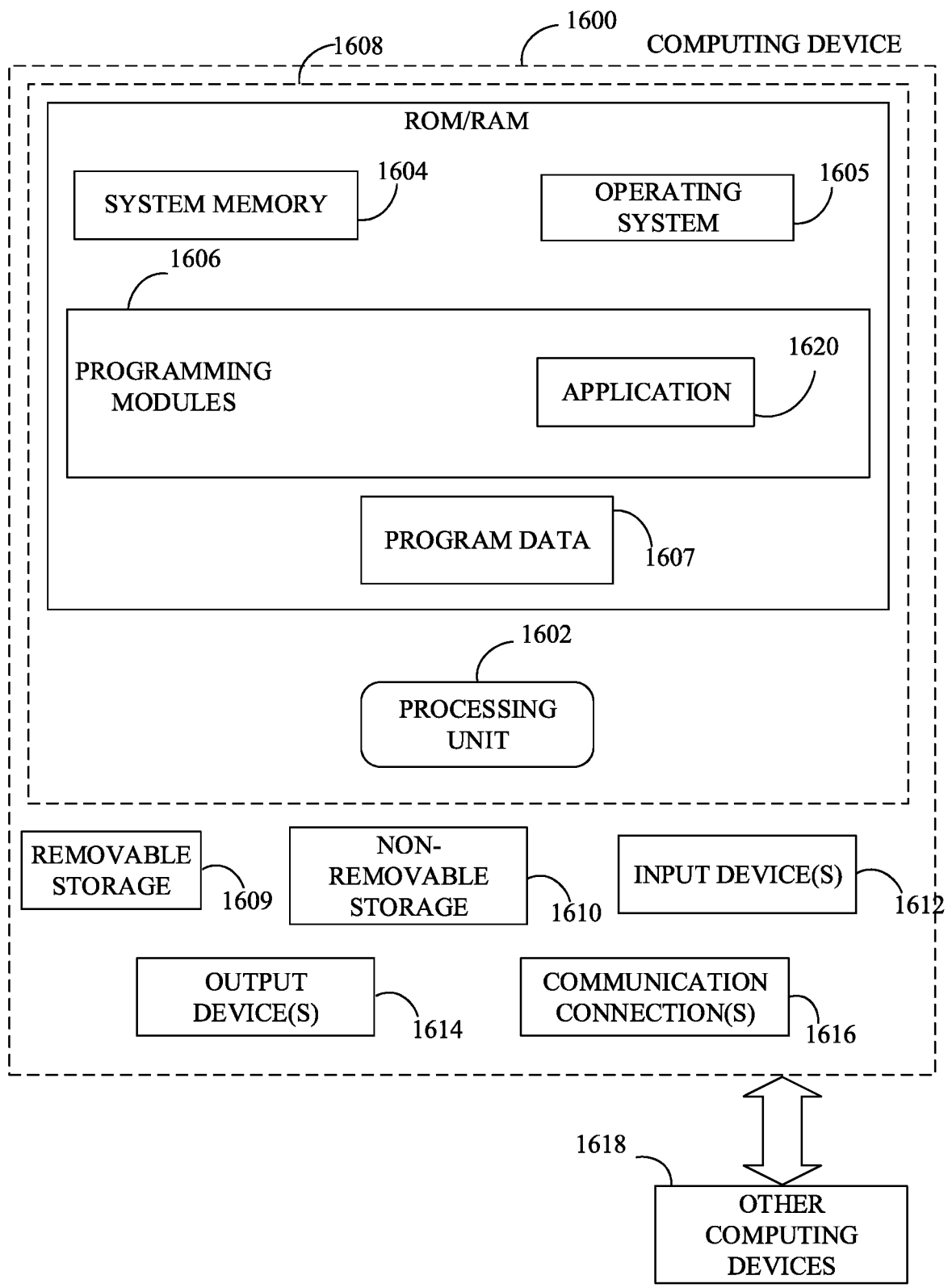
FIG. 16 is a block diagram of a computing device for implementing the methods disclosed herein, in accordance with some embodiments.

With reference to FIG. 16, a system consistent with an embodiment of the disclosure may include a computing device or cloud service, such as computing device 1600. In a basic configuration, computing device 1600 may include at least one processing unit 1602 and a system memory 1604. Depending on the configuration and type of computing device, system memory 1604 may comprise, but is not limited to, volatile (e.g. random-access memory (RAM)), non-volatile (e.g. read-only memory (ROM)), flash memory, or any combination. System memory 1604 may include operating system 1605, one or more programming modules 1606, and may include a program data 1607. Operating system 1605, for example, may be suitable for controlling computing device 1600's operation. In one embodiment, programming modules 1606 may include image-processing module, machine learning module. Furthermore, embodiments of the disclosure may be practiced in conjunction with a graphics library, other operating systems, or any other application program and is not limited to any particular application or system. This basic configuration is illustrated in FIG. 16 by those components within a dashed line 1608.

Computing device 1600 may have additional features or functionality. For example, computing device 1600 may also include additional data storage devices (removable and/or non-removable) such as, for example, magnetic disks, optical disks, or tape. Such additional storage is illustrated in FIG. 16 by a removable storage 1609 and a non-removable storage 1610. Computer storage media may include volatile and non-volatile, removable and non-removable media implemented in any method or technology for storage of information, such as computer-readable instructions, data structures, program modules, or other data. System memory 1604, removable storage 1609, and non-removable storage 1610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1600. Any such computer storage media may be part of device 1600. Computing device 1600 may also have input device(s) 1612 such as a keyboard, a mouse, a pen, a sound input device, a touch input device, a location sensor, a camera, a biometric sensor, etc. Output device(s) 1614 such as a display, speakers, a printer, etc. may also be included. The aforementioned devices are examples and others may be used.

Computing device 1600 may also contain a communication connection 1616 that may allow device 1600 to communicate with other computing devices 1618, such as over a network in a distributed computing environment, for example, an intranet or the Internet. Communication connection 1616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 1604, including operating system 1605. While executing on processing unit 1602, programming modules 1606 (e.g., application 1620 such as a media player) may perform processes including, for example, one or more stages of methods, algorithms, systems, applications, servers, databases as described above. The aforementioned process is an example, and processing unit 1602 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method of generating a customized response based on a context, the method comprising:
   receiving, using a communication device, at least one sensor data from at least one sensor, wherein the at least one sensor data is associated with at least one user;
   analyzing, using a processing device, the at least one sensor data;
   determining, using the processing device, a context based on the analyzing;
   identifying, using the processing device, a customized profile associated with the context;
   retrieving, using a storage device, the customized profile; and
   generating, using the processing device, a customized response based on the at least one sensor data and the customized profile;
   wherein the at least one sensor comprises a microphone configured to receive the at least one sensor data, wherein the at least one sensor data comprises a sound data, wherein the analyzing comprises performing sound processing, wherein the customized profile comprises a customized media profile, wherein the customized response comprises a customized media response;
   wherein the sound data comprises a natural language input and a voice command input, wherein the voice command input comprises an instruction, wherein the analyzing comprises natural language processing, wherein the customized media profile comprises a customized voice profile and a background sound profile, wherein the generating comprises translation of the natural language input based on the instruction and the customized media profile to generate the customized media response, wherein the customized media response comprises a customized natural language response and a background sound response;
wherein the voice command input comprises the context, wherein the instruction of the voice command input comprises a request by the at least one user for translating the natural language input into a person voice associated with a person, wherein the request comprises a person identifier associated with the person, wherein the identifying comprises selecting the customized voice profile associated with the person from a plurality of customized voice profiles associated with a plurality of persons based on the person identifier, wherein the translation comprises applying the person voice associated with the person to the natural language input to generate the customized natural language response, wherein the customized natural language response is associated with the person voice.

2. The method of claim 1 further comprising:
receiving, using the communication device, at least one natural language query associated with the at least one user from at least one input device;
analyzing, using the processing device, the at least one natural language query;
generating, using the processing device, at least one natural language reply based on the analyzing of the at least one natural language query;
applying, using the processing device, the person voice to the at least one natural language reply based on the selecting of the customized voice profile associated with the person;
generating, using the processing device, at least one customized natural language reply based on the applying of the person voice to the at least one natural language reply, wherein the at least one customized natural language reply is associated with the person voice; and
transmitting, using the communication device, the at least one customized natural language reply to at least one output device.

3. The method of claim 1 further comprising:
receiving, using the communication device, at least one first natural language query associated with at least one first user from at least one first input device;
retrieving, using the storage device, at least one first natural language reply based on the at least one first natural language query;
applying, using the processing device, the person voice to the at least one first natural language reply based on the selecting of the customized voice profile associated with the person;
generating, using the processing device, at least one first customized natural language reply based on the applying of the person voice to the at least one first natural language reply, wherein the at least one first customized natural language reply is associated with the person voice; and
transmitting, using the communication device, the at least one first customized natural language reply to at least one first output device.

4. The method of claim 1 further comprising:
receiving, using the communication device, a sample natural language input associated with the person from a second input device;
analyzing, using the processing device, the sample natural language input;
determining, using the processing device, at least one voice characteristic associated with the person based on the analyzing of the sample natural language input;
generating, using the processing device, the customized voice profile associated with the person based on the determining of the at least one voice characteristic of the person; and
storing, using the storage device, the customized voice profile.

5. The method of claim 4 further comprising assigning, using the processing device, the customized voice profile to the person based on the generating of the customized voice profile, wherein the selecting of the customized voice profile is further based on the assigning.

6. The method of claim 1 further comprising:
receiving, using the communication device, at least one first request from at least one third input device;
analyzing, using the processing device, the at least one first request;
identifying, using the processing device, at least one textual content based on the analyzing of the at least one first request;
converting, using the processing device, the at least one textual content into at least one natural language content based on the identifying of the at least one textual content;
applying, using the processing device, the person voice to the at least one natural language content based on the selecting of the customized voice profile associated with the person;
generating, using the processing device, at least one customized natural language content based on the applying the person voice to the at least one natural language content, wherein the at least one customized natural language content is associated with the person voice; and
transmitting, using the communication device, the at least one customized natural language content to at least one third output device.

7. The method of claim 1 further comprising transmitting, using the communication device, a plurality of person identifiers associated with the plurality of persons for translating the natural language input into a plurality of person voices associated with the plurality of persons, wherein the request further comprises a selection of the person identifier of the plurality of person identifiers.

8. The method of claim 1 further comprising:
retrieving, using the storage device, at least one media content associated with the person based on the person identifier;
analyzing, using the processing device, the at least one media content;
determining, using the processing device, at least one voice characteristic of the person based on the analyzing of the at least one media content;
generating, using the processing device, the customized voice profile of the person based on the determining of the at least one voice characteristic; and
assigning, using the processing device, the customized voice profile to the person based on the generating of the customized voice profile, wherein the selecting of the customized voice profile is based on the assigning.

9. A method of generating a customized response based on a context, the method comprising:
receiving, using a communication device, at least one sensor data from at least one sensor, wherein the at least one sensor data is associated with at least one user;

analyzing, using a processing device, the at least one sensor data;

determining, using the processing device, a context based on the analyzing;

identifying, using the processing device, a customized profile associated with the context;

retrieving, using a storage device, the customized profile; and generating, using the processing device, a customized response based on the at least one sensor data and the customized profile;

wherein the at least one sensor comprises a microphone configured to receive the at least one sensor data, wherein the at least one sensor data comprises a sound data, wherein the analyzing comprises performing sound processing, wherein the customized profile comprises a customized media profile, wherein the customized response comprises a customized media response;

wherein the sound data comprises a natural language input and a voice command input, wherein the voice command input comprises an instruction, wherein the analyzing comprises natural language processing, wherein the customized media profile comprises a customized voice profile and a background sound profile, wherein the generating comprises translation of the natural language input based on the instruction and the customized media profile to generate the customized media response, wherein the customized media response comprises a customized natural language response and a background sound response;

wherein the voice command input comprises the context, wherein the instruction of the voice command input comprises a request by the at least one user for translating the natural language input into a person voice associated with a person, wherein the request comprises a person identifier associated with the person, wherein the identifying comprises selecting the customized voice profile associated with the person from a plurality of customized voice profiles associated with a plurality of persons based on the person identifier, wherein the translation comprises applying the person voice associated with the person to the natural language input to generate the customized natural language response, wherein the customized natural language response is associated with the person voice;

receiving, using the communication device, at least one natural language query associated with the at least one user from at least one input device;

analyzing, using the processing device, the at least one natural language query;

generating, using the processing device, at least one natural language reply based on the analyzing of the at least one natural language query;

applying, using the processing device, the person voice to the at least one natural language reply based on the selecting of the customized voice profile associated with the person;

generating, using the processing device, at least one customized natural language reply based on the applying of the person voice to the at least one natural language reply, wherein the at least one customized natural language reply is associated with the person voice; and transmitting, using the communication device, the at least one customized natural language reply to at least one output device.

10. The method of claim 9 further comprising:

receiving, using the communication device, a sample natural language input associated with the person from a second input device;

analyzing, using the processing device, the sample natural language input;

determining, using the processing device, a voice associated with the person based on the analyzing of the sample natural language input;

generating, using the processing device, the customized voice profile associated with the person based on the determining of the voice of the person; and storing, using the storage device, the customized voice profile.

11. The method of claim 10 further comprising assigning, using the processing device, the customized voice profile to the person based on the generating of the customized voice profile, wherein the selecting of the customized voice profile is further based on the assigning.

12. The method of claim 9 further comprising:

retrieving, using the storage device, at least one media content associated with the person based on the person identifier;

analyzing, using the processing device, the at least one media content;

determining, using the processing device, the person voice of the person based on the analyzing of the at least one media content;

generating, using the processing device, the customized voice profile of the person based on the determining of the person voice; and assigning, using the processing device, the customized voice profile to the person based on the generating of the customized voice profile, wherein the selecting of the customized voice profile is based on the assigning.

13. A system of generating a customized response based on a context, the system comprising:

a communication device configured for receiving at least one sensor data from at least one sensor, wherein the at least one sensor data is associated with at least one user;

a processing device communicatively coupled with the communication device, wherein the processing device is configured for:

analyzing the at least one sensor data;

determining a context based on the analyzing;

identifying a customized profile associated with the context; and generating a customized response based on the at least one sensor data and the customized profile;

a storage device communicatively coupled with the processing device, wherein the storage device is configured for retrieving the customized profile;

wherein the at least one sensor comprises a microphone configured to receive the at least one sensor data, wherein the at least one sensor data comprises a sound data, wherein the analyzing comprises performing sound processing, wherein the customized profile comprises a customized media profile, wherein the customized response comprises a customized media response;

wherein the sound data comprises a natural language input and a voice command input, wherein the voice command input comprises an instruction, wherein the analyzing comprises natural language processing, wherein the customized media profile comprises a customized voice profile and a background sound profile, wherein the generating comprises translation of the natural language input based on the instruction and the customized media profile to generate the customized media response, wherein the customized media response comprises a customized natural language response and a background sound response; and
wherein the voice command input comprises the context, wherein the instruction of the voice command input comprises a request by the at least one user for translating the natural language input into a person voice associated with a person, wherein the request comprises a person identifier associated with the person, wherein the identifying comprises selecting the customized voice profile associated with the person from a plurality of customized voice profiles associated with a plurality of persons based on the person identifier, wherein the translation comprises applying the person voice associated with the person to the natural language input to generate the customized natural language response, wherein the customized natural language response is associated with the person voice.

14. The system of claim 13, wherein the communication device is further configured for:
receiving at least one natural language query associated with the at least one user from at least one input device; and
transmitting at least one customized natural language reply to at least one output device, wherein the processing device is further configured for:
analyzing the at least one natural language query;
generating at least one natural language reply based on the analyzing of the at least one natural language query;
applying the person voice to the at least one natural language reply based on the selecting of the customized voice profile associated with the person; and
generating the at least one customized natural language reply based on the applying of the person voice to the at least one natural language reply, wherein the at least one customized natural language reply is associated with the person voice.

15. The system of claim 13, wherein the communication device is further configured for:
receiving at least one first natural language query associated with at least one first user from at least one first input device; and
transmitting at least one first customized natural language reply to at least one first output device, wherein the storage device is further configured for retrieving at least one first natural language reply based on the at least one first natural language query, wherein the processing device is further configured for:
applying the person voice to the at least one first natural language reply based on the selecting of the customized voice profile associated with the person; and
generating the at least one first customized natural language reply based on the applying of the person voice to the at least one first natural language reply, wherein the at least one first customized natural language reply is associated with the person voice.

16. The system of claim 13, wherein the communication device is further configured for receiving a sample natural language input associated with the person from a second input device, wherein the processing device is further configured for:

analyzing the sample natural language input;
determining at least one voice characteristic associated with the person based on the analyzing of the sample natural language input; and
generating the customized voice profile associated with the person based on the determining of the at least one voice characteristic of the person, wherein the storage device is further configured for storing the customized voice profile.

17. The system of claim 16, wherein the processing device is further configured for assigning the customized voice profile to the person based on the generating of the customized voice profile, wherein the selecting of the customized voice profile is further based on the assigning.

18. The system of claim 13, wherein the communication device is further configured for:
receiving at least one first request from at least one third input device; and
transmitting at least one customized natural language content to at least one third output device, wherein the processing device is further configured for:
analyzing the at least one first request;
identifying at least one textual content based on the analyzing of the at least one first request;
converting the at least one textual content into at least one natural language content based on the identifying of the at least one textual content;
applying the person voice to the at least one natural language content based on the selecting of the customized voice profile associated with the person; and
generating the at least one customized natural language content based on the applying the person voice to the at least one natural language content, wherein the at least one customized natural language content is associated with the person voice.

19. The system of claim 13, wherein the communication device is further configured for transmitting a plurality of person identifiers associated with the plurality of persons for translating the natural language input into a plurality of person voices associated with the plurality of persons, wherein the request further comprises a selection of the person identifier of the plurality of person identifiers.

20. The system of claim 13, wherein the storage device is further configured for retrieving at least one media content associated with the person based on the person identifier, wherein the processing device is further configured for:
analyzing the at least one media content;
determining at least one voice characteristic associated with the person based on the analyzing of the at least one media content;
generating the customized voice profile of the person based on the determining of the at least one voice characteristic; and
assigning the customized voice profile to the person based on the generating of the customized voice profile, wherein the selecting of the customized voice profile is based on the assigning.

* * * * *